US005866888A

United States Patent [19]

[11] Patent Number: 5,866,888
[45] Date of Patent: Feb. 2, 1999

Bravman et al.

[54] TRAVELER SECURITY AND LUGGAGE CONTROL SYSTEM

[75] Inventors: Richard Bravman, Smithtown; Ynjiun P. Wang, Stony Brook, both of N.Y.; D. C. Toedt, III; Stefan G. Vingsbo, both of Houston, Tex.

[73] Assignee: Symbol Technologies, Inc., Holtsville, N.Y.

[21] Appl. No.: 411,289

[22] Filed: Mar. 27, 1995

Related U.S. Application Data

[60] Division of Ser. No. 923,771, Aug. 3, 1992, Pat. No. 5,401,944, which is a continuation-in-part of Ser. No. 642,775, Jan. 18, 1991, Pat. No. 5,159,635, and a continuation-in-part of Ser. No. 616,026, Nov. 20, 1990, abandoned.

[51] Int. Cl.[6] ...................... G06F 17/00
[52] U.S. Cl. .................. 235/375; 235/462; 235/384
[58] Field of Search .................. 235/379, 382, 235/384, 375, 462; 902/3, 4, 5

[56] References Cited

U.S. PATENT DOCUMENTS

| | | | |
|---|---|---|---|
| 3,752,312 | 8/1973 | Soltanoff | 209/3.3 |
| 4,065,343 | 12/1977 | Stumpe | 235/462 X |
| 4,634,849 | 1/1987 | Klingen | 235/487 |
| 4,647,917 | 3/1987 | Anderson, III et al. | 340/572 |
| 4,707,592 | 11/1987 | Ware | 235/379 |
| 4,775,246 | 10/1988 | Edelmann et al. | 380/23 |
| 5,051,565 | 9/1991 | Wolfram | 235/384 |
| 5,163,098 | 11/1992 | Dahbura | 380/24 |
| 5,243,655 | 9/1993 | Wang | 235/462 X |

*Primary Examiner*—Anita Pellman Gross
*Assistant Examiner*—Michael G. Lee
*Attorney, Agent, or Firm*—Finnegan, Henderson, Farabow, Garrett & Dunner, L.L.P.

[57] ABSTRACT

A two-dimensional bar code is used to identify a traveler's luggage, permitting the luggage to be tracked and, if desired, to be delivered to the traveler's ultimate destination (e.g., a hotel). If the traveler is traveling on an airline, a corresponding two-dimensional bar code is applied to the traveler's boarding pass. A two-dimensional bar code reader is used to read the boarding-pass bar code of each enplaning passenger; comparison of these bar codes with luggage bar-code data permits an alarm to be raised if each item of checked luggage is not matched by an enplaned passenger. The boarding-pass bar code may take the form of an integrated passenger identification code for use by, e.g., rental car companies, hotels, and the like.

20 Claims, 23 Drawing Sheets

| PDF 417 SECURITY LEVEL | |
|---|---|
| SECURITY LEVEL | ERROR CORRECTION CODEWORDS |
| 0 | 0 |
| 1 | 2 |
| 2 | 6 |
| 3 | 14 |
| 4 | 30 |
| 5 | 62 |
| 6 | 126 |
| 7 | 254 |
| 8 | 510 |

FIG. 20
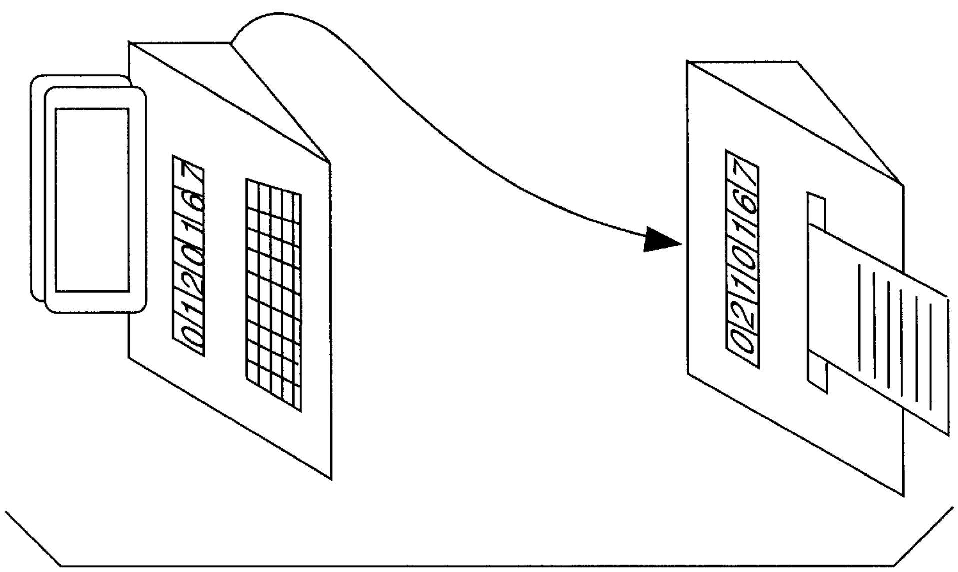
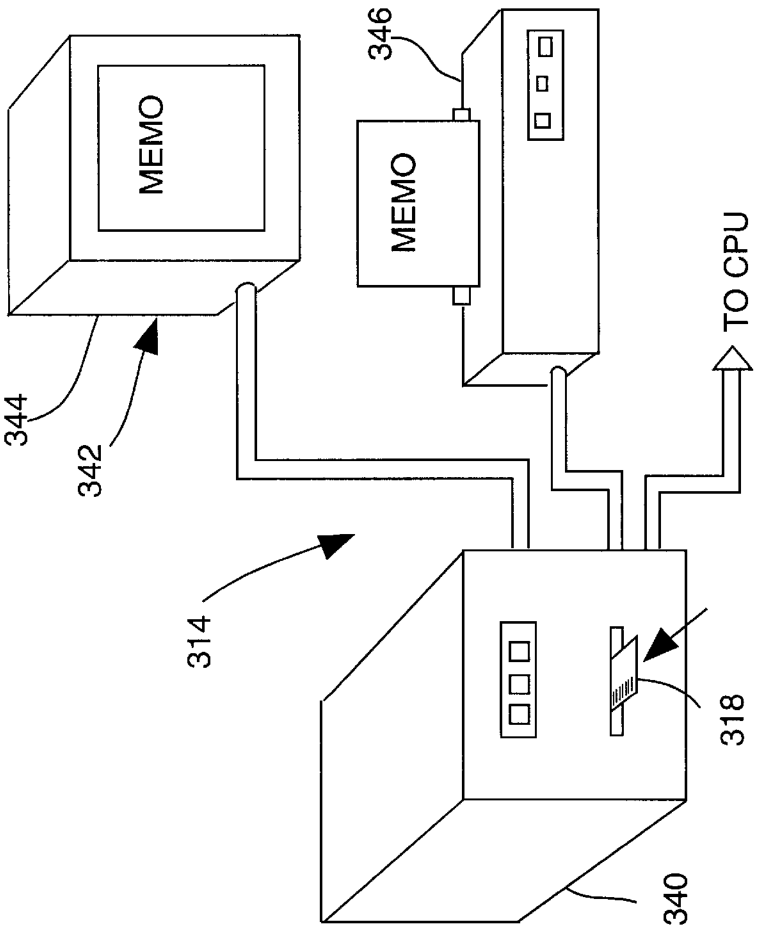
FIG. 19

| COLUMN | 1 | 2 | 3 | 4 | 5 | 6 | 7 | 8 | 9 | 10 |
|---|---|---|---|---|---|---|---|---|---|---|
| VALUE | $L_2$ | V | V | V | BAD | V | BAD | V | V | $R_1$ |
| CLUSTER | 6 | 6 | 6 | 6 | BAD | 3 | BAD | 3 | 3 | 3 |

| COLUMN | 1 | 2 | 3 | 4 | 5 | 6 | 7 | 8 | 9 | 10 |
|---|---|---|---|---|---|---|---|---|---|---|
| VALUE | $L_2$ | V | V | V | BAD | V | BAD | V | V | $R_1$ |
| CLUSTER | 6 | 6 | 6 | 6 | BAD | 3 | BAD | 3 | 3 | 3 |
| WEIGHT | H | H | H | M | | L | | M | H | H |

FIG. 26B

| COLUMN | 1 | 2 | 3 | 4 | 5 | 6 | 7 | 8 | 9 | 10 |
|---|---|---|---|---|---|---|---|---|---|---|
| VALUE | $L_2$ | V | V | V | BAD | V | BAD | V | V | $R_1$ |
| CLUSTER | 6 | 6 | 6 | 6 | BAD | 3 | BAD | 3 | 3 | 3 |
| WEIGHT | H | H | H | M | | L | | M | H | H |
| ROW | 2 | 2 | 2 | 2 | | 1 | | 1 | 1 | 1 |

FIG. 26C

TRAVELER SECURITY AND LUGGAGE CONTROL SYSTEM

BACKGROUND OF THE INVENTION

This application is a division of U.S. patent application Ser. No. 07/923,771 filed Aug. 3, 1992 now U.S. Pat. No. 5,401,944, which is a continuation-in-part application combining U.S. patent application Ser. No. 07/642,775 filed Jan. 18, 1991 now U.S. Pat. No. 5,159,635, and U.S. Ser. No. 07/616,026 filed Nov. 20, 1990 now abandoned, which applications are relied upon and incorporated by reference herein.

1. Field of Invention

The present invention relates to apparatus and method for utilizing bar codes in the travel industry. Although, the present invention is suitable for identifying, tracking, and locating, for example, with respect to many types of travel, it is particularly advantageous for airplane travel and will be described in connection therewith.

2. Discussion of Related Art

Traveling by air from one point to another for one or more days involves numerous transactions with several different types of services. For example, initial arrangements may be made through a travel agency, such as advanced bookings of flights, rental cars, and hotel rooms. Typically travel agencies provide their traveler customers with pocket-sized folders containing airline tickets, a detailed itinerary including the rental car and hotel information; and sometimes connecting boarding passes. Upon arrival at the airport, the travelers bags are checked; and he or she is given appropriate claim checks. At the boarding location, each traveler presents a boarding pass to a gate attendant. On the plane, the attendant assists in determining that the passengers are properly seated. Sometimes special meals are served to certain passengers who request them; and passengers with special connections are singled out. Security guards are frequently used in the baggage claim area to compare luggage claim check numbers to minimize theft and receipt of the wrong luggage. The passenger then goes to a rental car desk where appropriate identification must be shown to a rental car attendant. Upon leaving the rental car area with the car, another attendant checks the agreement, to determine authorization. Upon arrival at the hotel, the traveler receives a room assignment, and presents a credit card.

Each of these transactions typically requires a separate piece of paper or different document in order for the passenger to expeditiously reach the desired destination. Upon the return trip most of the transactions again occur in reverse order. Not only is the constant attention to the different pieces of paper a nuisance and tiring to the traveler; in many instances, service is lacking and is not attentive to all of the needs that lend themselves to travel enjoyment.

In this connection, traveling still can be made more inconvenient because of lost or delayed luggage; and made more insecure by realizing that it is possible to check your baggage without boarding the flight, which is common practice by persons wishing to disrupt the flight.

SUMMARY OF INVENTION

One of the objects of the present invention is to minimize the risk of an individual checking baggage without boarding the plane.

Another object of the present invention is to provide a system where all passenger distribution information is encoded and read from a luggage tag so that it can be routed accurately and expeditiously to a passenger's desired destination.

Another object of the present invention is to replace the several pieces of paper needed for identification, entitlement, and reservation in traveling to one single convenient record boarding pass able to contain voluminous information needed or desirable to provide traveling comfort in an expeditious manner.

Additional objects of the invention will be set forth in part in the description which follows, and in part will be apparent from that description or may be learned by practice of this invention. The advantages of this invention may be realized and attained by means of the instrumentalities and combinations particularly pointed out in the appended claims.

To achieve the objects and in accordance with the purpose of the invention, as embodied and broadly described herein, a boarding pass according to this invention comprises a relatively small single unitary sheet with passenger identification, and extensive travel information relating to the identified passenger encoded in a two-dimensional bar code, thereon said two-dimensional bar code being machine readable.

In another aspect, a carrier passenger boarding control system according to this invention comprises checked passenger data storage means; check-in means for inputting identification data to checked-in passenger data storage means, the data including passenger ID data identifying a passenger traveling aboard the carrier, and luggage ID data identifying at least one luggage item checked by the passenger for shipment aboard the carrier; means for encoding in two-dimensional bar code said passenger data in at least one boarding pass associated with passenger and means for encoding in two-dimensional bar code luggage data in at least one luggage item, each luggage tag corresponding to a boarding pass; at least one of (a) at least one luggage tag having encoded therein two-dimensional bar code corresponding to luggage item final destination data identifying a destination of the luggage item subsequent to completion of travel aboard the carrier, and (b) boarding pass having encoded therein two-dimensional bar code corresponding to passenger optional travel preference data; boarded-passenger data storage means, linked with checked in passenger storage means; and boarding-pass reader means for reading the two-dimensional bar code in one or more boarding passes and storing the passenger ID data encoded therein in boarded-passenger data storage means.

In still another aspect, the present invention relates to a traveler data management system, comprising flight data storage means; passenger reservation data storage means; machine means for reading a two-dimensional bar code symbol from a passenger ID record device; means for comparing said two-dimensional bar code corresponding to ID data with said passenger reservation data to generate two-dimensional bar code corresponding to checked-in passenger data, checked-in passenger data storage means; and means for updating said checked-in passenger data storage means with said checked-in passenger data.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

BRIEF DESCRIPTION OF THE DRAWINGS

FIG. 19 is a perspective view of a recognition means of the system in FIG. 17;

FIG. 20 is a perspective view of a data entry device and reader in which a key may be entered for encrypting and decrypting data;

FIG. 24 is a diagram illustrating the various width measurements that are used for the "t-sequence" of a codeword;

FIGS. 26A, 26B, and 26C are diagrams showing an example of a codeword vector;

DETAILED DESCRIPTION OF SPECIFIC EMBODIMENTS

A number of specific embodiments of the invention are described here. It will be understood that these embodiments are presented for purposes of illustration and not as limiting the scope of the invention as claimed below.

Figure 1:
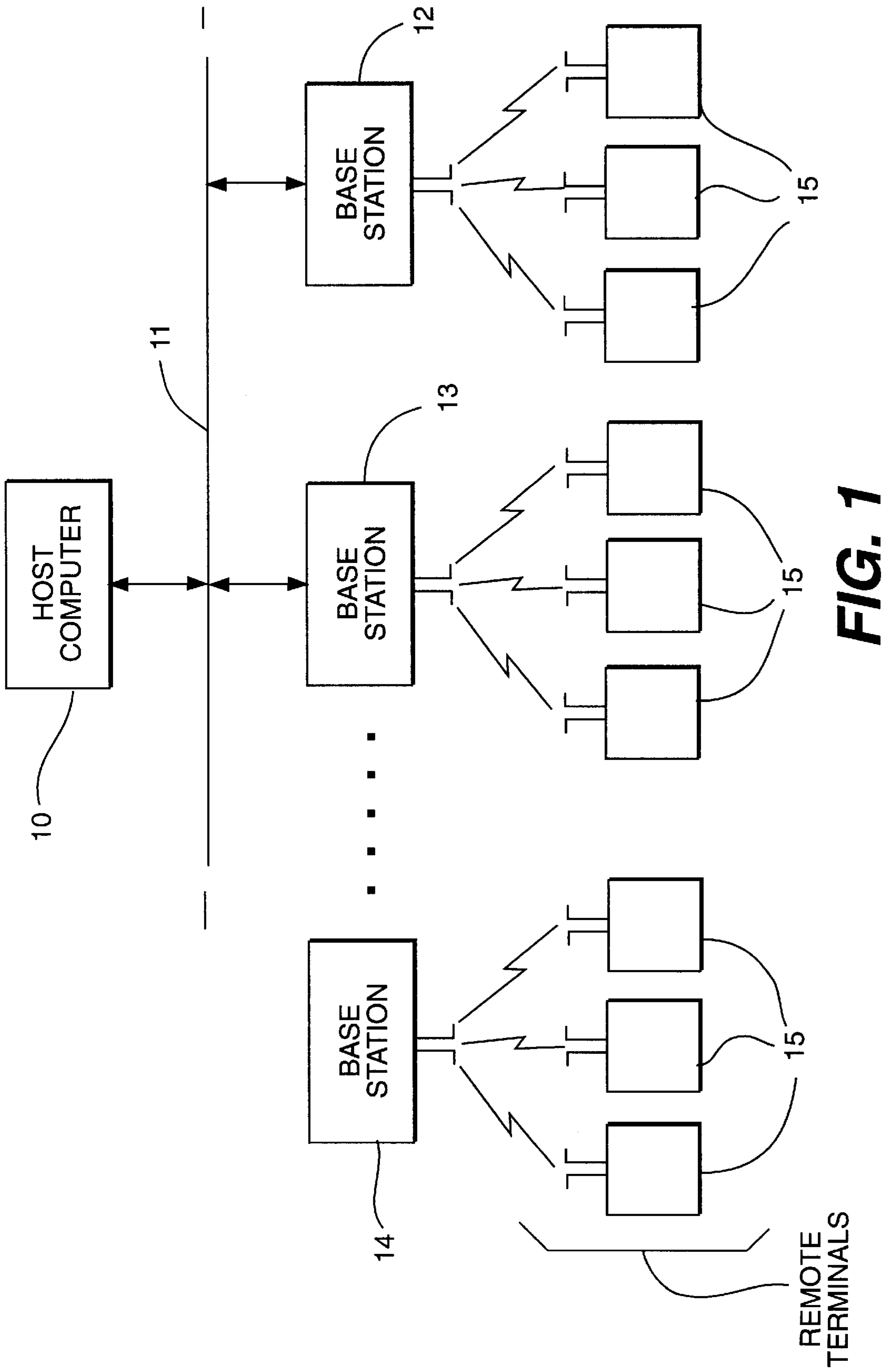
FIG. 1 is an electrical diagram in block form of a communication system featured in certain embodiments of the invention.
Figure 2:
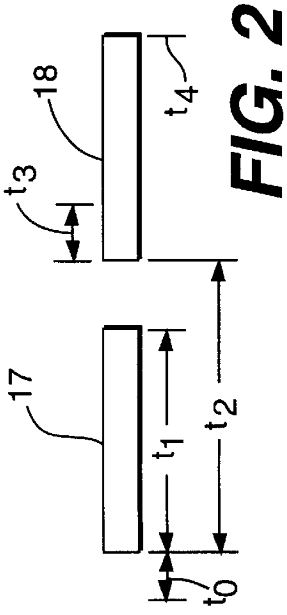
FIG. 2 is a timing diagram showing events (RF transmission) vs. time for a data transmission sequence in the illustrative system of FIG. 1.

Referring to FIG. 1, an exemplary data communications network used in practicing the present invention is shown; the network is described in more detail in the commonly assigned U.S. Pat. No. 5,029,183 issued Jul. 2, 1991, which is incorporated by reference herein. A host processor 10 is connected by a communications link 11 to a number of base stations 12 and 13; other base stations 14 can be coupled to the host through the base stations 12 or 13 by an RF (radio frequency) link. Each one of the base stations 12, 13, or 14 is coupled by an RF link to one or more remote units 15 (sometimes referred to for convenience herein as "terminals" or "readers"). The RF link utilizes a protocol, a timing diagram of which is depicted in FIG. 2 as explained in more detail in the aforementioned U.S. patent. Alternatively, the remote units 15 may be connected to the host processor 10 by physical wiring, perhaps via one or more intermediary units 12, 13, or 14.

In one embodiment of the invention, the remote units 15 are laser-scan bar-code readers capable of reading two-dimensional bar code PDF417 of the hand-held, battery-operated type, for example, as disclosed in U.S. Pat. Nos. 4,387,297; 4,409,470; or 4,760,248, all commonly assigned with this application to Symbol Technologies, Inc. and incorporated by reference herein. Various other types of remote terminals may be advantageously employed in a system in accordance with the invention; these remote terminals would ordinarily include data entry facilities such as a keyboard or the like, as well as a display (or printer) for indicating to a user information detected, transmitted, and/or received by the remote unit 15.

In the embodiment used as an illustrative example, there may be from one to sixty-four of the base stations 12, 13, and 14 (three being shown in the Figure), and up to several hundred of the remote units 15. Of course, the network may be expanded by merely changing the size of address fields and the like in the digital system.

Although hand-held, laser-scan type bar-code readers are mentioned here by way of example, the terminals 15 may also be bar-code readers of the CCD type, and except as may be otherwise mentioned below may be stationary rather than hand-held. In other embodiments, the device may be of the optical character recognition (OCR) type as well.

Figure 3:
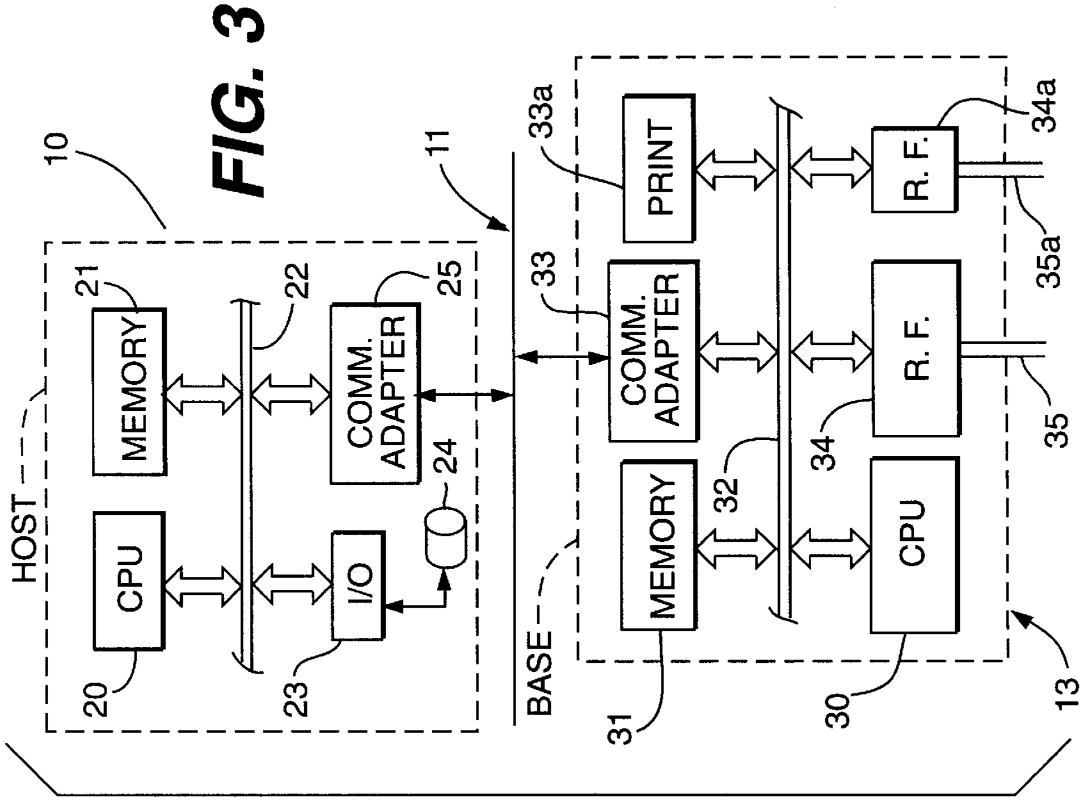
FIG. 3 is a more detailed electrical schematic diagram in block form of the host computer and one of the base stations in the illustrative system of FIG. 1.

Referring to FIG. 3, one typical host-computer architecture is shown. The host processor 10 maintains a database management system (DBMS), employing suitable database management software similar to that commercially available, to which the remote units 15 make entries or inquiries via the base stations 12, 13, and 14. The host processor 10 has a CPU 20 which may be a microprocessor device of the 80386 type manufactured by Intel Corporation, for example, and the CPU accesses a memory 21 via a main bus 22 to execute instructions. Various I/O processors 23 are used to access peripherals such as keyboard, video display, etc., as well as disk storage 24 for the database system and other computer functions. A communications adapter 25 couples the CPU 20 via the main bus 22 to the link 11. This communications link 11 may be of the serial type such as RS-232, or alternatively the link 11 may use one of the available local area network (LAN) type of protocols.

The base stations 12, 13, and 14 each utilize a CPU 30 which accesses a memory 31 via a local bus 32, also seen in FIG. 3. This data processing unit is coupled to the serial link 11 via a communications adapter 33. A printer 33*a* may be included which may be driven by the CPU 30 via the local bus 32 to print data from the memory 31. An RF transceiver 34 is coupled to the CPU 30 in each base station via the local bus 32 and is connected to an antenna 35 for RF transmission to and reception from the remote units 15. An additional RF transmitter 34*a* may be used, as well, as an RF link to and from other base stations, if necessary. An example of a commercially-available microprocessor device which may be used as the CPU 30 is a V-25 device manufactured by NEC Corporation, which is the same device used in the remote units 15.

The base stations 12, 13, and 14 are ordinarily located in various rooms or bays of the commercial establishment containing the network of FIG. 1. The RF signal path in this environment is changeable in nature as equipment, fork-lift trucks, furniture, doors, etc., are moved about, or as the user moves from place to place and carries the hand-held remote unit with him, or as the network is expanded or reduced in size; there is a high degree of multipathing in this type of RF link. Thus, the particular one of the base stations communicating at a given time with one of the remote units 15 may change; to this end a "hand-off" protocol may be utilized as described in the aforesaid U.S. patent application to change the base station which is designated to handle a remote unit. In this manner, a remote unit 15 has a confirmed link with only one base station at a time, although other base stations may be within range of the remote unit 15.

The base station 12, 13, or 14 is merely an intermediary. The remote unit is communicating with the host processor 10, and the function of a base station is merely to relay data from a remote unit to the host computer or vice versa. In some installations there may be only one base station, in which case the communications link 11 may be a direct connection via an RS-232 serial port and cable or, if the building is such that the base station can be mounted at the same location as the host computer, the link 11 may be replaced by a parallel bus-to-bus interface, in which case the base station and host computer may be considered a single unit.

Figure 4:
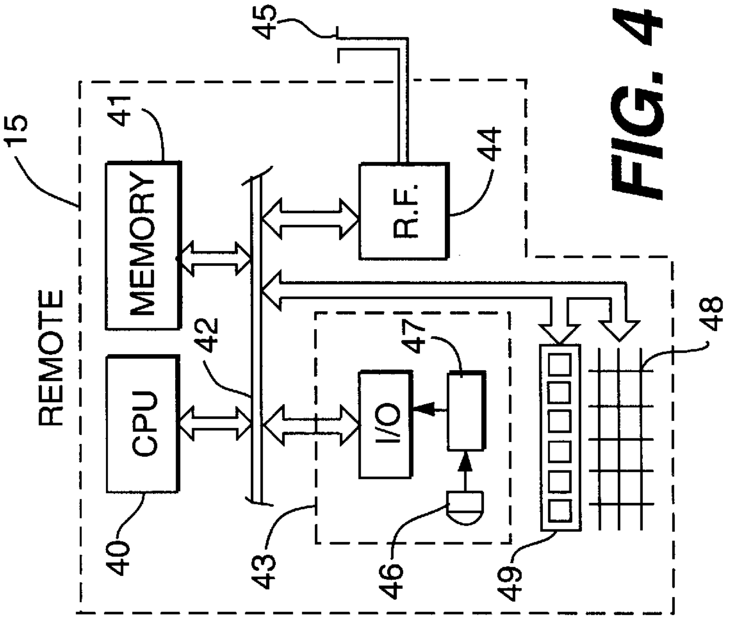
FIG. 4 is a more detailed electrical diagram in block form of one of the remote terminals in the system of FIG. 1.

Referring to FIG. 4, each remote unit 15 in the example embodiment is a data terminal (e.g., a hand-held bar code reader) having a CPU 40 executing instructions from a program and data memory 41 which is coupled to the CPU via a local bus 42. A peripheral bar code data acquisition device 43 is coupled to the CPU via the bus 42 and is used to detect and/or convert data from the bar code scanning section to be stored in the memory 41 and processed by the CPU 40; other control devices may interface with a keyboard and display. An RF transceiver 44 is coupled to and controlled by the CPU via the bus 42, and transmits the coded RF signal through an antenna 45 or detects and converts RF received by the antenna, according to a protocol. In an alternative embodiment, the terminal unit 15 may be connected with the host computer 10 via a conventional electrical or optical cable. Usually the remote unit 15 has a manual data entry device such as a keyboard 48, and a visual display 49 such as an LCD device.

Figure 5:
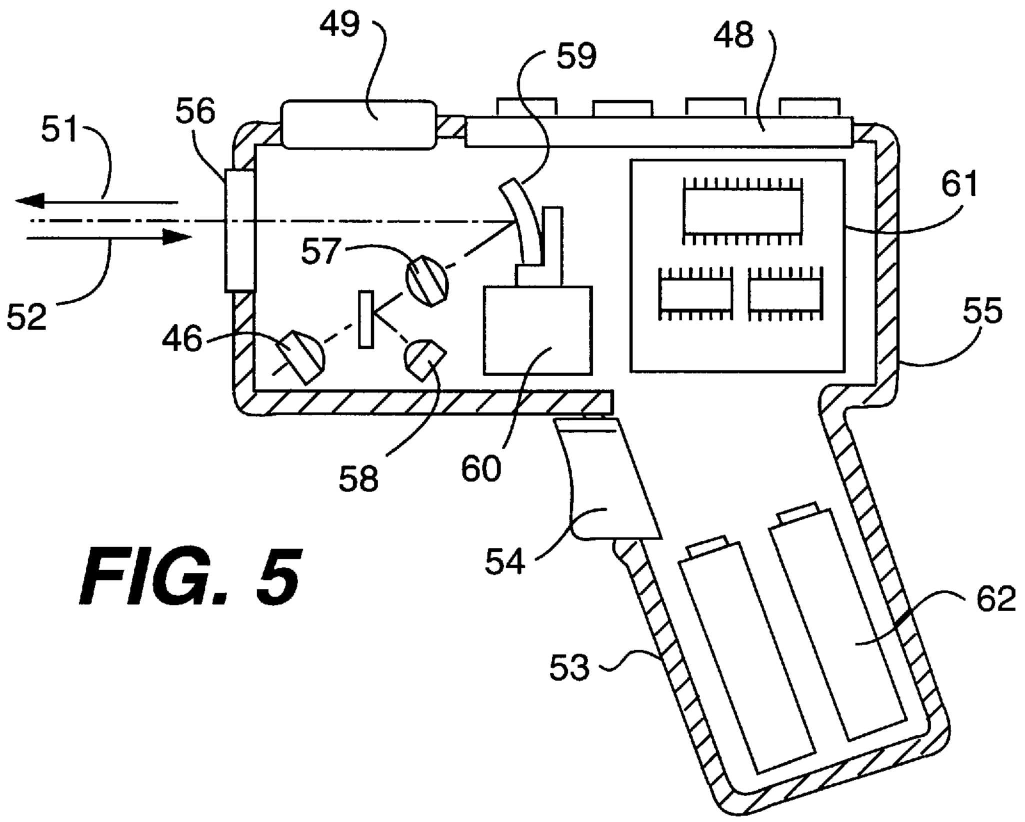
FIG. 5 is a sectional view of a hand-held bar code scanner unit which may be used as a remote terminal in certain embodiments of the invention.
Figure 6:
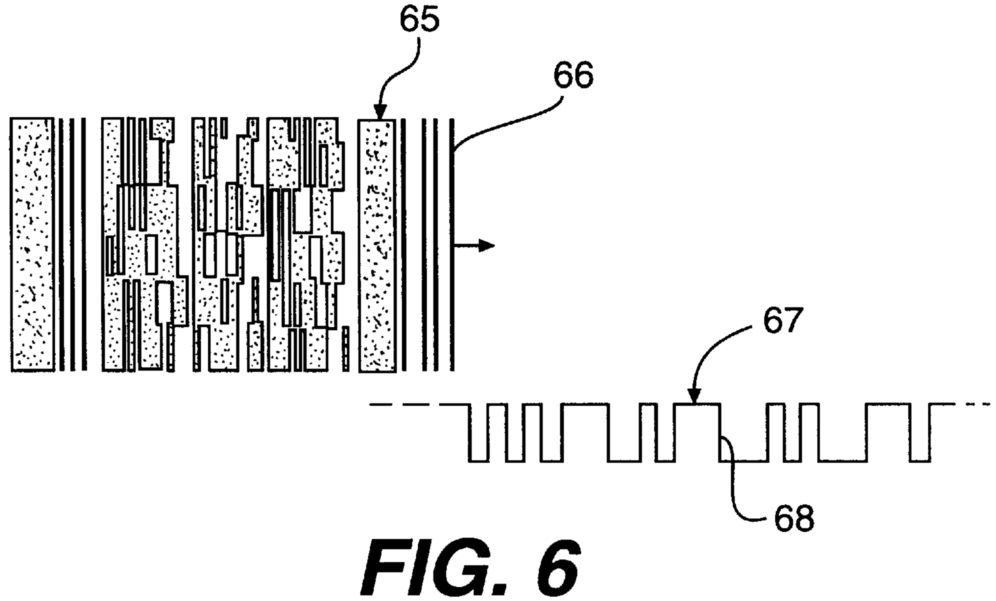
FIG. 6 is a view of a part of a bar code symbol that may be read by the remote unit of FIGS. 4 and 5 or 5*a;*

Although other data terminal units 15 may be advantageously employed in a system having features of the invention, a hand-held, laser-scan, bar code reader unit as illustrated in FIG. 5 is an example of a remote unit particularly suited for use in the system of FIG. 1. This hand-held device of FIG. 5 is generally of the style disclosed in U.S. Pat. Nos. 4,760,248, 4,806,742, or 4,816,660, commonly assigned with this application to Symbol Technologies, Inc., which are incorporated by reference herein and also similar to the configuration of a bar code reader commercially available as part number LS 8100II from Symbol Technologies. Alternatively, or in addition, features of U.S. Pat. Nos. 4,409,470 or 4,816,661 may be employed in constructing the bar code reader 15 of FIG. 4 to the extent they are suitable for reading the two-dimensional bar code.

Referring to FIG. 5, an outgoing light beam 51 is generated in the reader 15, usually by a laser diode or the like, and directed to impinge on a bar code symbol a few inches from the front of the reader unit. The outgoing beam 51 is scanned in a fixed linear pattern, and the user positions the hand-held until so this scan pattern traverses the bar code symbol to be read. Reflected light 52 from the symbol is detected by a light-responsive device 46 in the reader unit, producing serial electrical signals to be processed for identifying the bar code. The reader unit 15 is a gun-shaped device having a pistol-grip type of handle 53, and a movable trigger 54 is employed to allow the user to activate the light beam 51 and detector circuitry when pointed at the symbol to be read, thereby saving battery life if the unit is self-powered. A lightweight plastic housing 55 contains the laser source, the detector 46, the optics and signal processing circuitry, and the CPU 40 and RF transceiver 44 of FIG. 4, as well as a battery. A light-transmissive window 56 in the front end of the housing 55 allows the outgoing light beam 55 to exit and the incoming reflected light 52 to enter.

Also seen in FIG. 5 in connection with the remote unit 15 are a lens 57 used to collimate and focus the scanned beam into the bar code symbol at the proper depth of field; a light source 58 such as a semiconductor diode; an oscillating mirror attached to a scanning motor 60 which is activated when the trigger 54 is pulled. The electronic components of FIG. 3 are mounted on one or more small circuit boards 61 within the housing 55 of FIG. 4, and batteries 62 are enclosed to provide a self-contained portable unit. The antenna 45 may be printed on one of the circuit boards 61.

In the applications described, it is particularly advantageous to utilize a high-density, two-dimensional bar code symbology PDF417 similar to that disclosed in the commonly assigned co-pending application Ser. No. 461,881, by Pavlidis et al, which is incorporated by reference herein as set forth in detail herewith.

FIGS. 7 through 12 set forth flow-chart logic diagrams of certain database management functions and the like that are performed by the illustrative embodiments. Those skilled in the art will appreciate that the actual optimum organization and structure of software to control various hardware components in accordance with the invention will depend greatly on the characteristics of the specific hardware with which the invention is implemented, and likewise that functions shown as implemented in software can equivalently be implemented in, e.g., discrete-logic hardware and vice versa. By and large, the flow charts do not set forth common error trapping/handling, boundary condition detection, and similar conventional functions.

Airline security may be promoted using one embodiment of the invention. One security problem with which airlines must attempt to contend is that of the terrorist who checks luggage for a flight but who does not board the flight because he or she knows that the checked luggage contains a bomb set to explode in flight. One known approach to combatting this threat is to refuse to check luggage except from ticketed passengers.

Figure 7:
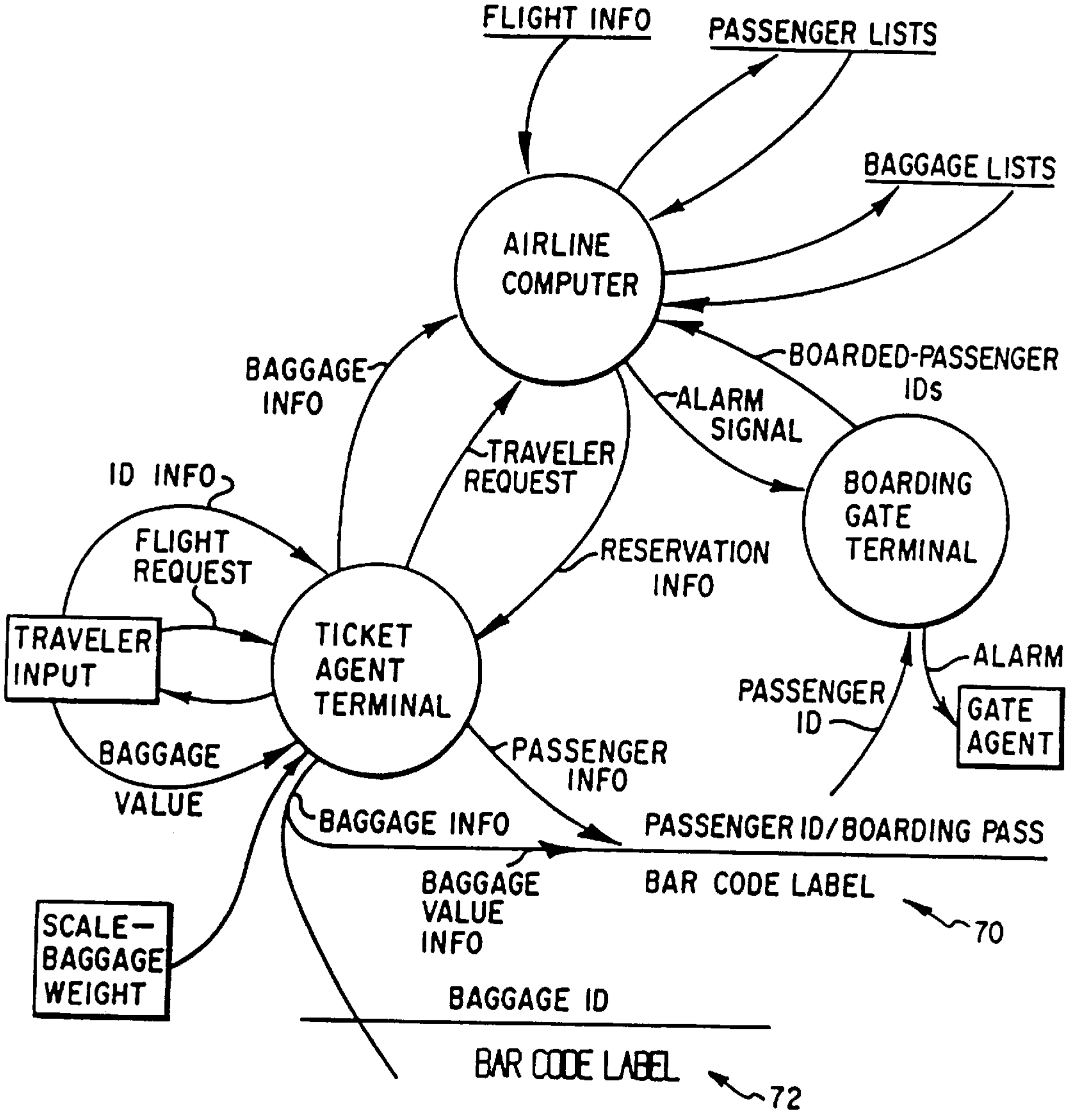
FIGS. 7 through 12 are logic flow diagrams outlining certain logical functions performed by systems and subsystems in accordance with the invention.

Referring to FIG. 7 (a Yourdon-DeMarco data flow diagram), a novel ticketing system may augment this approach by reducing the likelihood that persons who check luggage will subsequently fail to board the flight without being detected. The ticketing system may include a terminal

15 generally of the kind described above and located, e.g., at an airline ticket counter. A ticketing agent may use the terminal 15 to enter information relating to e.g., the passenger's origination and destination points, scheduled departure and arrival times, and the like.

Notably, the terminal 15 is used to enter a passenger identification code that may be assigned by the airline or other carrier at check-in time. The passenger identification code may be the next available number from a convenient series of number, or it may be derived in any convenient manner, e.g., by using a suitable hashing function that takes as inputs one or more of the flight information, the passenger's name or social security number, and the like. In one embodiment, the memory 31 of the base station 12, 13, or 14 may include instructions for the CPU 30 to generate a passenger identification code; the information used in the generation process may be obtained from the remote unit 15 and/or from a flight-information data file 74, for example, maintained by the host computer 10 in disk storage 24.

The printer 33 is used to print a two-dimensional PDF417 bar code label 70 on a boarding pass or alternatively on a stick-on label to be applied to a boarding pass. The bar code label 70 includes the aforementioned passenger identification code as well as any other desired information, e.g., the passenger's name, address, seat assignment, advance beverage orders, information about any special handling required for the passenger (e.g., special meals), connecting-flight information, rental car, hotel information and the like.

Referring still to FIG. 7, the PDF417 two-dimensional passenger identification code is also printed in a bar code 72 on a luggage tag (or on a stick-on label to be applied to a luggage tag) that is attached (e.g., at the ticket counter) to any luggage being checked by the passenger. The bar code 72 may also include the passenger's name, address, and destination information for quick identification and passenger notification in the event the luggage goes astray. Because the PDF417 bar code is of sufficient capacity, the ticket agent may additionally enter a brief description of each piece of luggage at the terminal, perhaps using appropriate menus of luggage descriptions, as well as all the information required to directly transport luggage to the destination desired by the passenger after leaving the carrier. This information may be included in the two-dimensional boarding-pass bar code 70 as well as in the luggage two-dimensional bar code 72.

For security purposes, the information stored in the bar codes 70 and 72 referred to above can be encrypted, and/or the bar codes can include a checksum or similar code, in any convenient manner, to make forgery and/or unauthorized information access more difficult.

Figure 8:
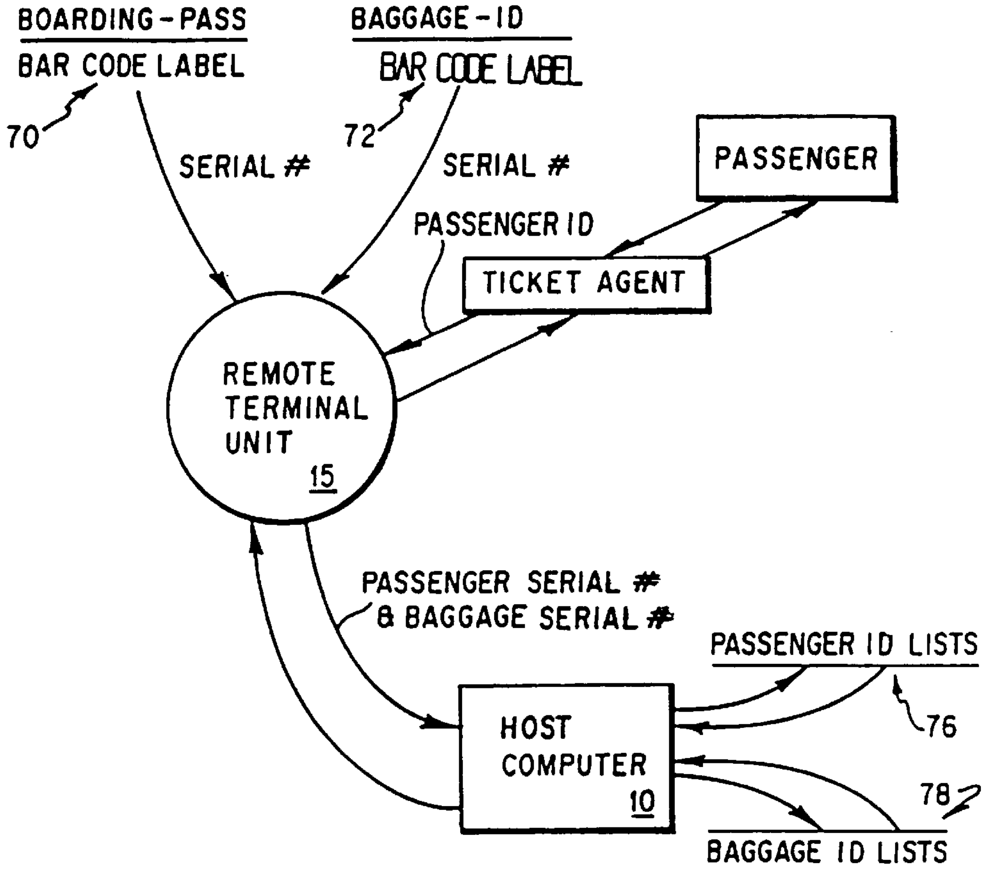

Referring now to FIG. 8, in an alternative embodiment the boarding passes are preprinted with two-dimensional bar-coded passenger identification codes 70 (e.g., boarding pass serial numbers). Similarly, numbered ticket-counter luggage tags, of the kind customarily fastened on bags when the bags are checked, may be preprinted with bar-code serial numbers 72. The ticket agent may use a fixed counter-mounted scanner (not shown) or a hand-held reader such as those shown in FIG. 5 to scan a boarding pass bar code 70 and all associated luggage tag bar codes 72; the host computer 10 may be programmed to receive the data from these scans and to create an association between the passenger and his or her checked bags in one or more data files such as, for example, a passenger ID file 76 and/or a baggage ID file 78.

In another alternative embodiment, the ticket agent may be equipped with peel-off/stick-on bar code labels of two kinds. The first kind includes bar codes of passenger identification codes 70, to be peeled off and applied to boarding pass that did not already have a passenger identification code printed thereon. The second kind includes bar codes of luggage identification codes 72, to be peeled off and applied to luggage tags that did not already have such bar code labels. The specific bar codes allocated to a given passenger are scanned as described above to create an association between the passenger and his or her checked bags in the data files 76, 78 maintained by the host computer 10.

Figure 9:
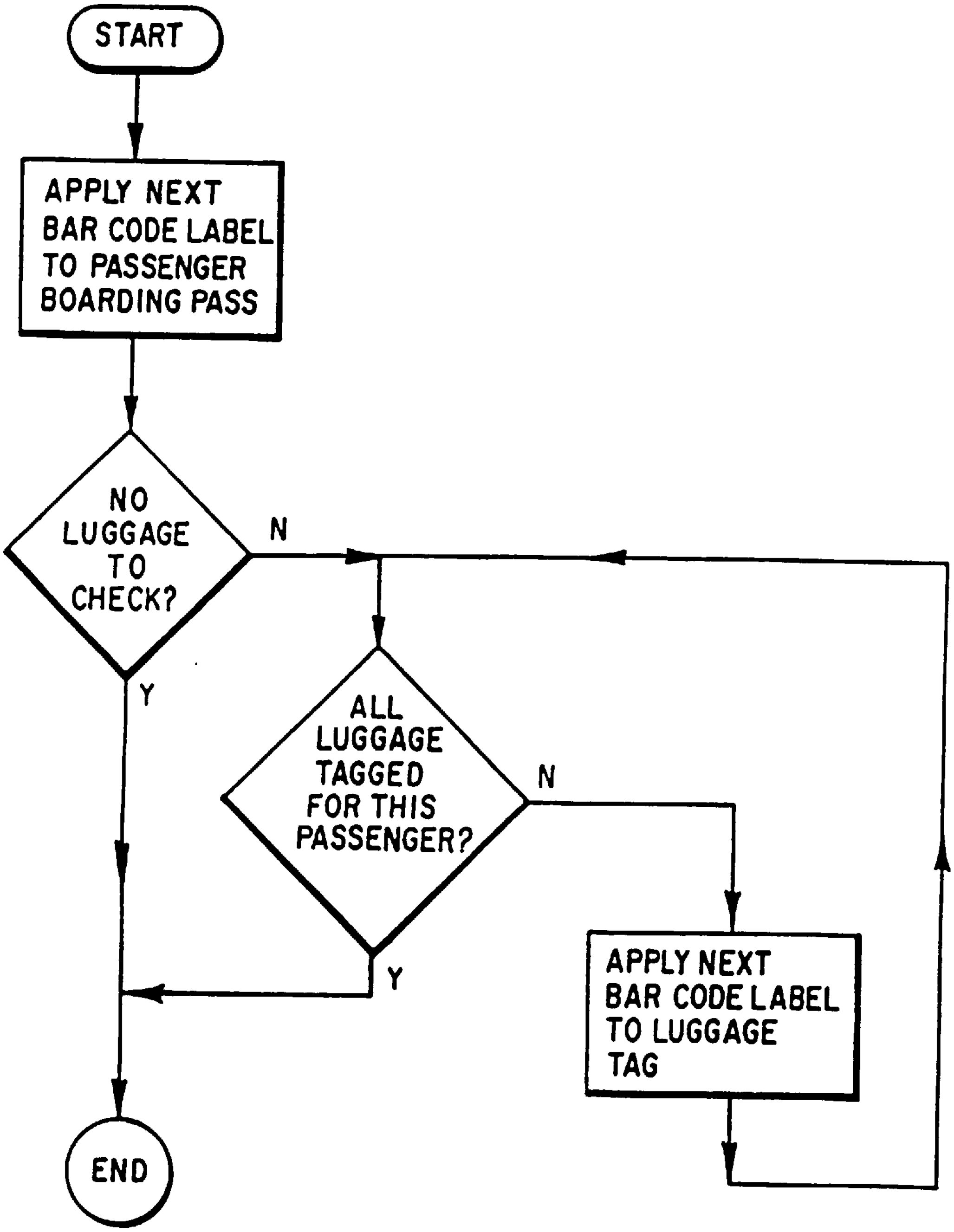
Figure 10:
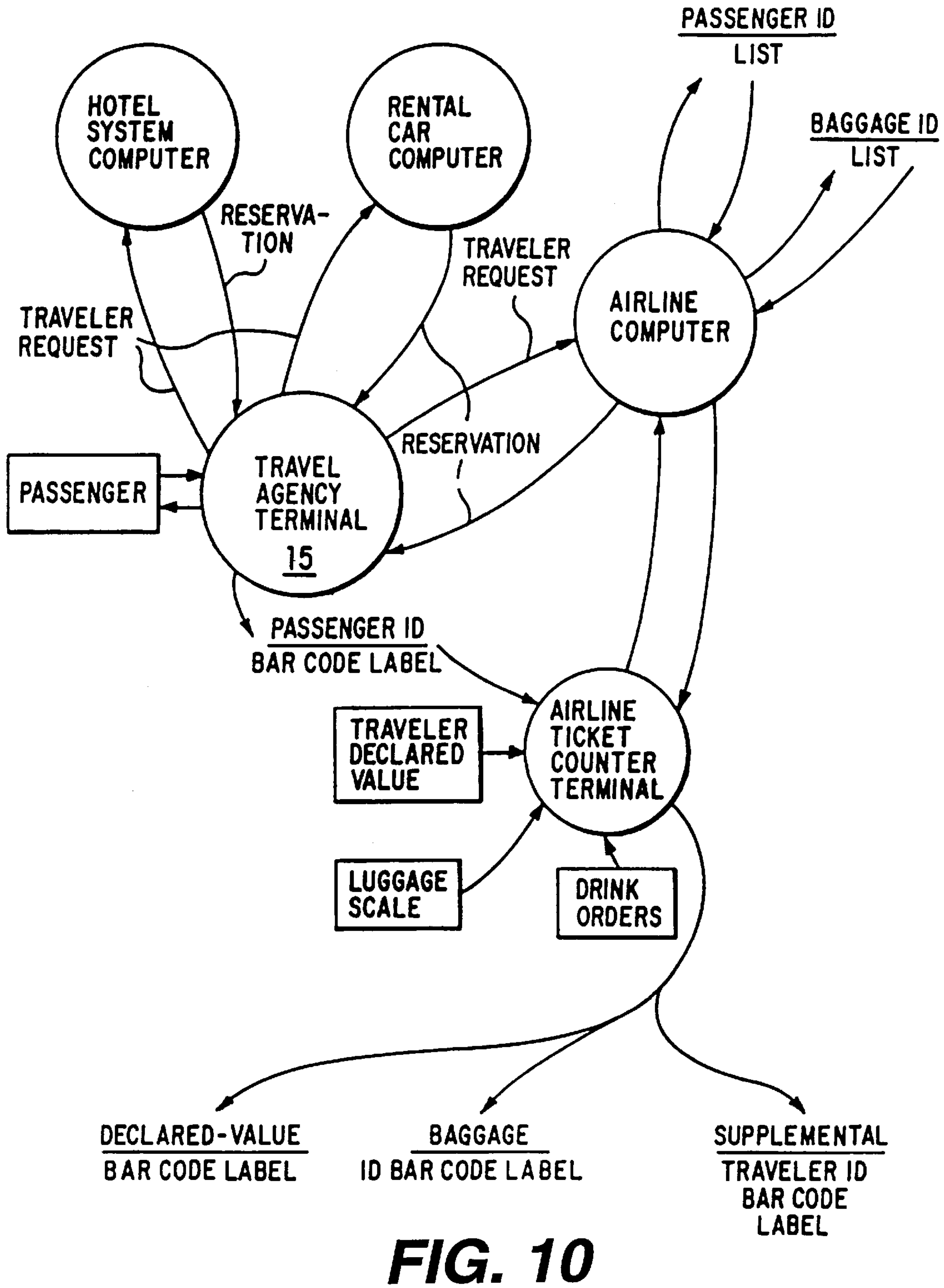
Figure 11:
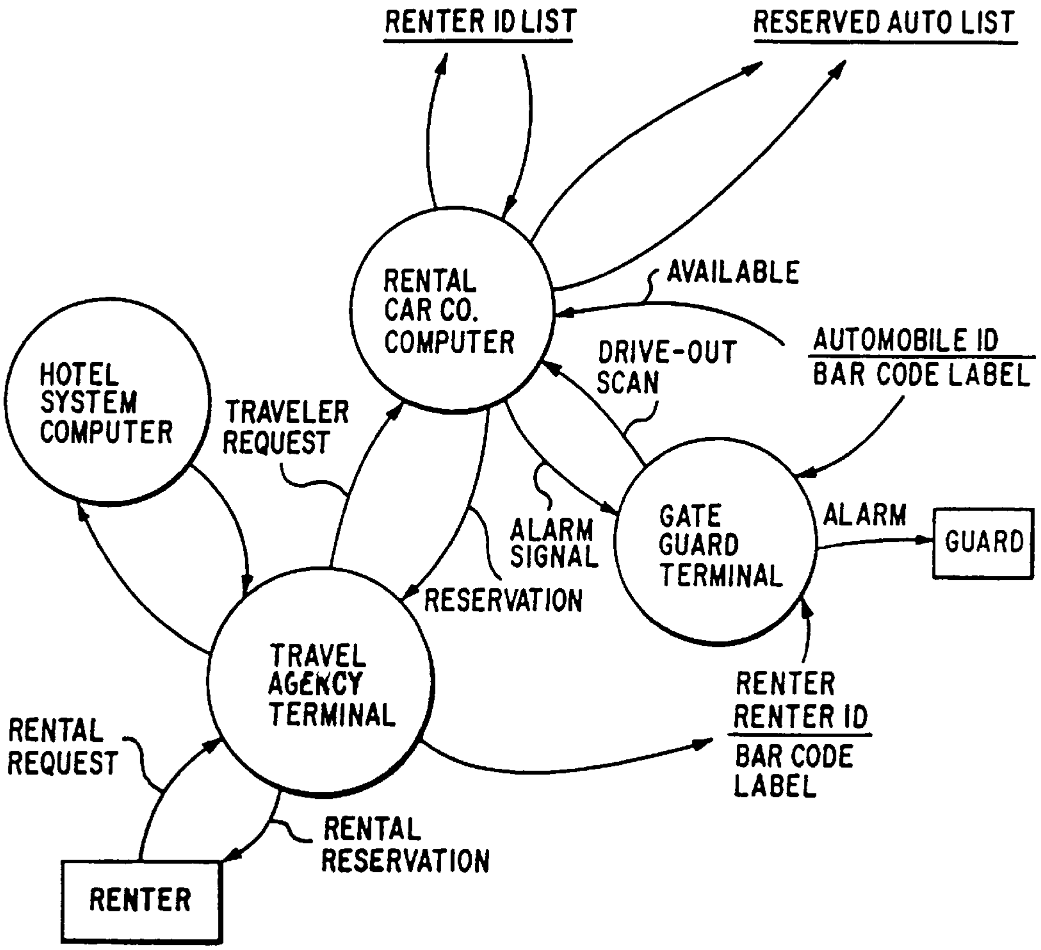
Figure 12:
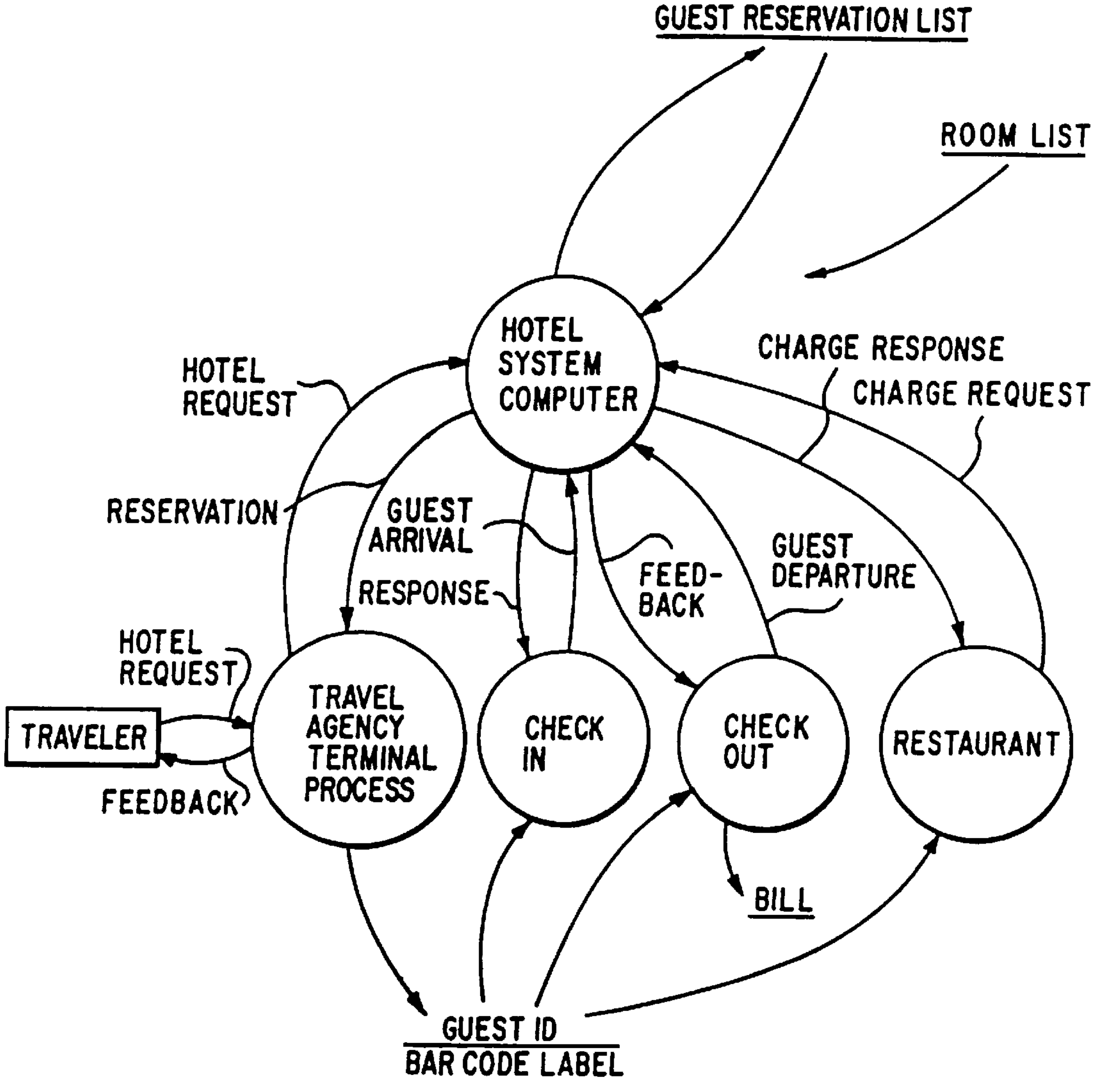

In still another alternative embodiment, a single kind of peel-off/stick-on bar code labels 70, numbered in a convenient sequential series (e.g., consecutive numbers, odd numbers, even numbers, every five minutes, etc.), are used. As illustrated in FIG. 9, when a passenger presents bags to be checked, (1) the next available numbered bar code label is applied to his or her boarding pass; (2) numbered bar code labels are applied in numerical sequence to each bag being checked by that passenger or to a luggage tag fastened thereto as described above; and (3) when all of that passenger's bags have been so labeled, the next available numbered bar code label is applied to the boarding pass. The serial numbers of the two bar codes on the passenger's boarding pass thus bracket (and thereby define a list of) the serial numbers of the bar codes applied to that passenger's checked luggage. The ticket agent may therefore scan the two boarding-pass bar codes 70 in the manner described above to identify the bags checked by the passenger in the data files maintained by the host computer 10; alternatively, each bag's bar code can be scanned for the same reason. For convenience, this alternative embodiment is referred to below as the "bracketing boarding-pass bar codes" embodiment.

It will be appreciated by those having the benefit of this disclosure that the "boarding pass" can be any convenient carrier for the bar codes described above.

At the boarding location (e.g., an airline boarding gate), a boarding verification system includes a remote terminal unit 15 that is linked to the host computer 10. Each passenger presents his or her boarding pass to a gate agent/operator who scans the bar code 70 using a reader such as shown in FIG. 5 in conjunction with, e.g., a terminal unit 15 and e.g., a base station 12, 13, or 14 (or alternatively using a fixed terminal 15 that has a landline-type link to the host computer 10). The terminal 15 transmits the passenger identification codes of boarded passengers to the host computer 10 either individually or in batch, as convenient. For example, the terminal 15 may be used to transmit this information in a batch after all passengers have boarded but just prior to closing up the aircraft for departure.

The host computer 10 compares those codes 70 with a list of passenger identification codes 70 associated with checked luggage for the flight in question in the computer's data files, e.g., in data files 76 and 78. If the computer 10 determines that some piece of checked luggage is not associated with a boarded passenger, a security alarm is transmitted, possibly to the display 49 of the terminal 15 and/or to a security station and/or to the luggage handling office. The alarm may include the above-mentioned description of the luggage in question to facilitate identification and segregation of the luggage (e.g., for examination by bomb-squad personnel).

If the bracketing boarding-pass bar code embodiment is in use, the host computer 10 retrieves data from its data files and builds a list of all serial numbers 70 and 72 assigned to passengers and bags that were checked for the flight in question as described above. Each consecutive series of serial numbers 72 assigned to checked bags should be matched by bracketing serial numbers 70 assigned to a boarding pass. If any boarding-pass serial numbers 70 are missing from the list at departure time, it follows that a passenger may have checked his or her bags but failed to have his or her boarding pass scanned at the boarding gate. The host computer 10 may then generate an appropriate alarm signal as described above.

A distributed-processing embodiment may also be used, as will be appreciated by those of ordinary skill having the benefit of this disclosure. The functions of the host computer 10 may be carried out by a base station 12, 13, or 14 at the boarding gate. The host computer 10 may download passenger and baggage data for the flight in question to the base station for temporary storage, e.g., in the memory 31 (or alternatively in disk storage, not shown in the Figure). The CPU 30, suitably programmed, may then perform the checking described above to determine whether any unaccompanied baggage was checked aboard the aircraft.

The remote terminal 15 used at the boarding gate may conveniently be carried on the aircraft itself and operated by the flight attendants or other personnel. Information scanned from boarding-pass bar codes 70 at the boarding gate may be stored in the memory 41 of the terminal 15; with suitable programming the terminal 15 may in turn be conveniently used as a stand-alone unit by flight attendants in flight to determine the names, meal preferences, advance beverage orders, connecting flight information, etc., of passengers sitting in various seats.

Alternatively, or in addition, the aircraft may carry its own base station 12, 13, or 14. While the aircraft is parked at the gate, the base station may be linked with an airline host computer 10 via the link 11. Information of the kind described above may be downloaded to the base station directly from the host computer for storage in the memory 31 of the base station; the terminal 15 may then be used in flight by the flight attendants in conjunction with the base station in a manner similar to that described above.

In an improved luggage security system, a security guard may be equipped with a suitably programmed terminal 15 and/or with a base station 12, 13, or 14. Instead of attempting to read serial numbers, the guard can scan the bar code 70 on an arriving passenger's boarding pass and the bar code(s) 72 on the luggage being carried by the passenger. If the bracketing boarding-pass bar code embodiment is used, the scanner/terminal need only determine whether the luggage bar codes 72 are bracketed by the two boarding-pass bar codes 70. In the event of a mismatch, an alarm signal is generated, e.g., on the display 49 of the terminal 15, allowing the security guard to investigate further.

Unclaimed luggage can conveniently be identified by airport or airline personnel, without opening the luggage, by scanning the luggage bar code 72. If the bar code 72 includes the passenger's name and address, it can be read by scanning it with a remote terminal 15. The luggage identification information encoded into the two-dimensional bar code 72 can contain the entire data base with all the information needed in order to identify and enable the passenger in question to be contacted (or, if the luggage has been misrouted to the wrong airport, to redirect it to the proper destination) without further data base accessing.

A passenger who checks luggage at a ticket counter may desire to have the luggage delivered to his or her hotel, office, home, or other destination. This could present an attractive alternative to carrying on large hanging bags, for example, or to checking luggage and being forced to wait 30 minutes to an hour at the destination airport to reclaim the checked luggage.

The system described herein may be used advantageously to implement such an alternative. Information about the desired delivery destination, e.g., the address, may be entered by the ticket agent using the ticketing terminal 15; alternatively, this information may be taken by a travel agency and entered using a travel agency terminal 15 as described below. The destination information may be included in the luggage bar code 72, which may be printed on a readily distinguishable stock (e.g., stock of a particular color or an especially bright color, etc.) to facilitate sorting at the destination airport.

When luggage from different flights arrives at a destination airport, luggage to be delivered is separated from luggage to be reclaimed at the baggage-claim area and placed temporarily in a receiving area. The luggage bar codes 72 for the various luggage pieces are scanned to obtain their delivery-destination information, e.g., by a remote terminal 15 upon arrival in the receiving area. A host computer 10 linked to the terminal 15 maintains a current list of luggage to be delivered and the destinations thereof, e.g., in a data file system as data files 76 and 78, possibly keyed to destination identifying data such as nine-digit ZIP codes, hotel names, or similar identifiers. If desired, a human-readable notation about the destination may be made by hand on the luggage tag for convenience.

Periodically (say, once per hour), the host computer 10 causes one or more lists to be printed of luggage to be delivered, sorted by destination into delivery groups. Each delivery group may be assigned to a van or other vehicle, in all likelihood several delivery groups to a vehicle. Using the lists as pick lists, delivery personnel load luggage into the appropriate vehicle. A terminal 15 is used to scan each bag's bar code 72 and transmit its identifying information to the host computer 10, which notes the fact that the bag has left the airport. The terminal's display 49 may be used to view the bag's destination as encoded in the bar code 72, thus providing a check that the bag is about to be taken to the correct destination.

At each hotel or other destination, delivery personnel or hotel service personnel (e.g., a bellman) unloads the luggage for that destination. A terminal 15 is used as described above to verify that each bag is being unloaded at the correct destination. This information may be transmitted by the terminal 15 to a host computer 10 in the delivery vehicle, or alternatively through an appropriate radio, cellular, or other link to the host computer 10 at the airport.

At the hotel, service personnel (e.g., a bellman) may use a terminal 15 to scan a bag's bar code 72 to obtain the passenger identification code of the bag's owner. The terminal 15 is linked with a hotel host computer 10, e.g., via a base station 12, 13, or 14 if used. If the owner has checked into the hotel using his or her passenger identification code as described below, the bellman may use the terminal's display 49 to display the bag owner's room number; he may make a handwritten notation on the bag's luggage tag, and the bag may be delivered directly to the room.

Again, the functions performed by the host computer 10 may equally well be performed by the CPU 30 and associated equipment of the base station 12, 13, or 14, with downloading of data as needed from the host computer 10.

Lost or damaged luggage is sometimes valued for compensation purposes as a function of the weight of the luggage unless the passenger declares a higher value and pays a fee. The ticket agent can query the passenger at check-in time about any higher value which the passenger wishes to declare for the luggage. This information and the weight of each bag (which may be obtained from a scale, not shown) may be included in the printed bar codes 72 and 70 on both the luggage and the passenger's boarding pass. Alternatively, to prevent unauthorized persons from scanning the luggage bar code in search of high-value pilferage targets, the declared value information may be printed solely in the boarding-pass bar code 70. The ticket agent may of course collect additional fees from passengers who declare luggage values in excess of predetermined limits.

Passenger claims for lost luggage can be processed expeditiously by using a terminal 15 to scan the boarding-pass bar code 70 and thereby ascertain the previously recorded weight of each bag and the value declared by the passenger as well as the passenger's name and address. Passengers can conveniently make such claims by mail by sending the original boarding pass to an airline claim office. This passenger may retain a photocopy of the boarding pass, including the bar code 70, for his or her records in case a dispute arises; the bar code 70 will of course be duplicated on the photocopy and thus can be scanned in the same manner as on the original boarding pass. Colored stocks and inks can be used in the usual manner to distinguish original boarding passes from photocopies.

The traveler security and luggage control system described above can be expanded to provide improved convenience for travelers. By way of background, it will be noted that travel agencies are frequently used by business travelers to make advanced booking of airline flights, rental cars, and hotel rooms. Travel agencies typically provide their traveler-customers with pocket-sized folders containing airline tickets and a detailed itinerary including rental car and hotel information. Boarding passes are often included in such folders.

Referring to FIG. 9, a travel agency terminal 15, including or linked with a base station 12, 13, or 14 if used, may include a printer such as the printer 33*a* capable of printing bar codes. The terminal 15 may be linked, e.g., via a landline, to an airline computer 10 that handles airline reservations and ticketing for travel agencies. The terminal 15 may be programmedin a manner known to those of ordinary skill to allow it to be used by a travel agent to make a flight reservation and obtain an advance seat assignment for a traveler in the conventional manner; the airline computer 10 returns a message including reservation and seat assignment information to the terminal 15 in a conventional manner.

The host computer 10 also returns a message (which of course may be a part of the message mentioned above) that includes a passenger identification code to the terminal 12. Travel agency personnel may then operate the printer to print a traveller ID bar code 101, e.g., on boarding-pass stock, generally in the manner described above. The traveler ID bar code 101 may be a consolidated one that includes the passenger identification code and other information as described herein to the extent such information is known at the time.

The travel-agency customer may desire to check luggage at the airline ticket counter. The airline ticket agent may scan the customer's traveler ID bar code as described above to obtain the customer's passenger identification code and other pertinent information, and print such information on luggage-tag bar codes 72 as described above. Furthermore, if the customer desires to declare a value for the luggage, in a supplemental baggage-value bar code 103, e.g., on a stick-on label to be applied to the boarding pass. In the process, the ticket agent could inquire of the customer about advance beverage orders, special meal orders, and the like in the manner described above.

The travel agency terminal 15 may additionally be linked to either or both of a rental car company computer 10 and a hotel system computer 10. When the travel agency terminal 15 is used to make reservations for a rental car or a hotel room, the rental car or hotel computer 10 returns a message to the terminal 12 that includes a customer identification code in generally the same manner as described above for airline passenger identification codes. The traveler ID bar code printed on the customer's boarding pass may then include information required by the hotel or rental car company in question, e.g., name, address, credit card information, driver's license number, and the like. Of course, if a standardized system is used for assigning identification code, a single traveler ID code could be used as the airline passenger identification code, the hotel customer identification code, etc.

The Traveler ID bar code is used in conjunction with one or more customer check-in terminals 15 at, e.g., a rental car customer service counter or a hotel registration desk. When the customer arrives at the counter or registration desk, he or she presents his boarding pass or other record device to the attendant, who operates the terminal 12 to scan the bar code on the boarding pass. The attendant may ask the customer for confirmatory identification, e.g., a driver's license, and operate the terminal (e.g., by pressing an ENTER key) to confirm the check-in on the customer. Alternatively, the customer himself could hold up the bar code in front of a fixed terminal 15 for comparatively unattended operation.

A hotel restaurant, gift shop, golf pro shop, executive office suite, or similar ancillary business may operate customer charge stations in conjunction with the boarding-pass bar code. A customer charge terminal 15 is linked with a hotel host computer 10, e.g., via base station 12, 13, or 14 if used. The hotel host computer 10 in turn is linked with the hotel's customer check-in terminal 15. When a customer checks in by presenting a boarding pass as described above, the host computer 10 notes the fact along with any other desired information such as the customer's credit limit. The customer may make charges by presenting his or her boarding pass; the bar code on the boarding pass is scanned by the terminal operator and the appropriate charge information is passed to the host computer 10 to be added to the customer's bill.

As described above, the bar code is printed on a single record device that is referred to herein for convenience as a "boarding pass" or "universal boarding pass." This record device may take the form of a card of convenient pocket size, e.g., about the size of a standard computer punch card, and made of stiff cardboard stock or similar material.

Figure 13:
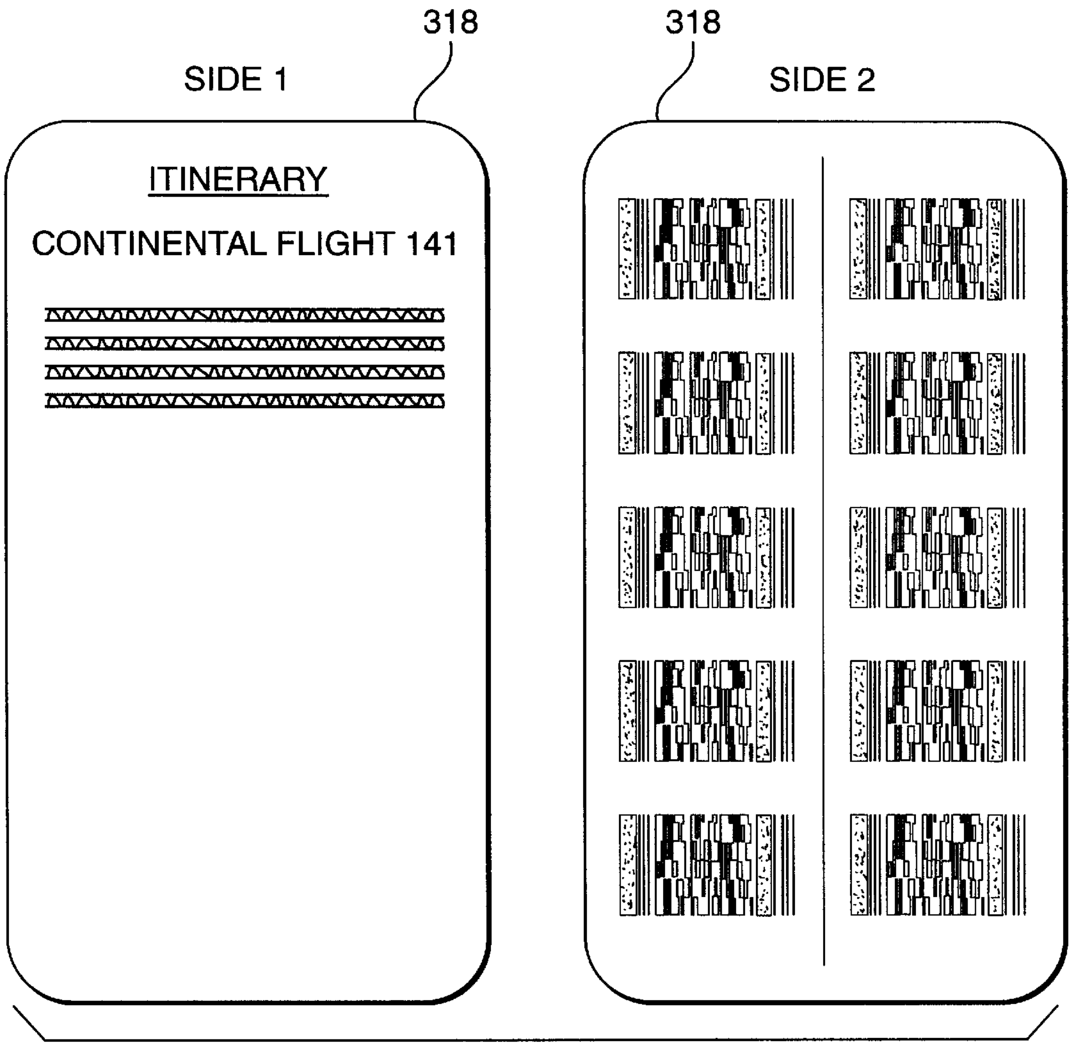
FIG. 13 is a depiction of an integrated customer identification device baggage claim, hotel information, rental car information, etc. in accordance with an embodiment of the invention.

In one embodiment shown in FIG. 13, a first side of the card includes a printed itinerary, perhaps printed in a small but readable font on a conventional laser printer; the other side of the card may include partitions in which bar codes may be printed or applied as stick-on labels, in much the same manner as exit and entry stamps are applied to partitioned sections of passport pages at customs control points. The partitions may be labeled "Airline 1," "Airline 2," "Hotel 1," etc., as shown in FIG. 5. In another embodiment, the partitions are unlabeled to allow maximum flexibility in the application of bar codes. A traveler would then conveniently be able to carry his tickets, boarding passes, rental car and hotel check-in identification, baggage claim checks, and the like, in a single convenient record device.

In another embodiment, the "boarding pass" may comprise a permanent integrated traveler identification document. Many airlines presently issue conventional plastic identification cards to members of their frequent-flyer clubs. Such cards may conveniently be produced in the form described above, but with a permanent customer identification number.

Most major rental car agencies commonly station guards at their parking lot exits. These guards verify that the driver of an existing car is indeed an authorized renter.

Such a guard may be equipped with and use a terminal 15 in much the same manner as described above in connection with baggage-claim area security guards described above. In particular, the guard may utilize the terminal to scan the bar code on the customer's boarding pass and a vehicle identification code inscribed or mounted on the rental car (e.g., etched onto the windshield or body or printed on a label permanently affixed to the windshield or body). An RF link transmits these data to a rental car host computer 10.

If the car's driver is authorized to have the car, the host computer 10 sends a signal to cause a gate to be opened; otherwise, an alarm signal may be generated.

The bar code which permits a "universal boarding pass" to include the voluminous information in the embodiments heretofore discussed is the PDF417 two-dimensional bar code. Before discussing the method and apparatus for encoding and decoding data in machine readable graphic form, it is important to understand the structure of the two-dimensional bar code symbol itself.

Each PDF417 symbol is composed of a stack of rows of bar-coded information. Each row in the symbol consists of a start pattern, several symbol characters called "codewords," and a stop pattern. A codeword is the basic unit for encoding a value representing, or associated with, certain numbers, letters, or other symbols. Collectively, the codewords in each row form data columns.

Both the number of rows and the number of data columns of the PDF417 symbol are variable. The symbol must have at least three rows and may have up to ninety rows. Likewise, within each row, the number of codewords or data columns can vary from three to thirty.

Figure 14:
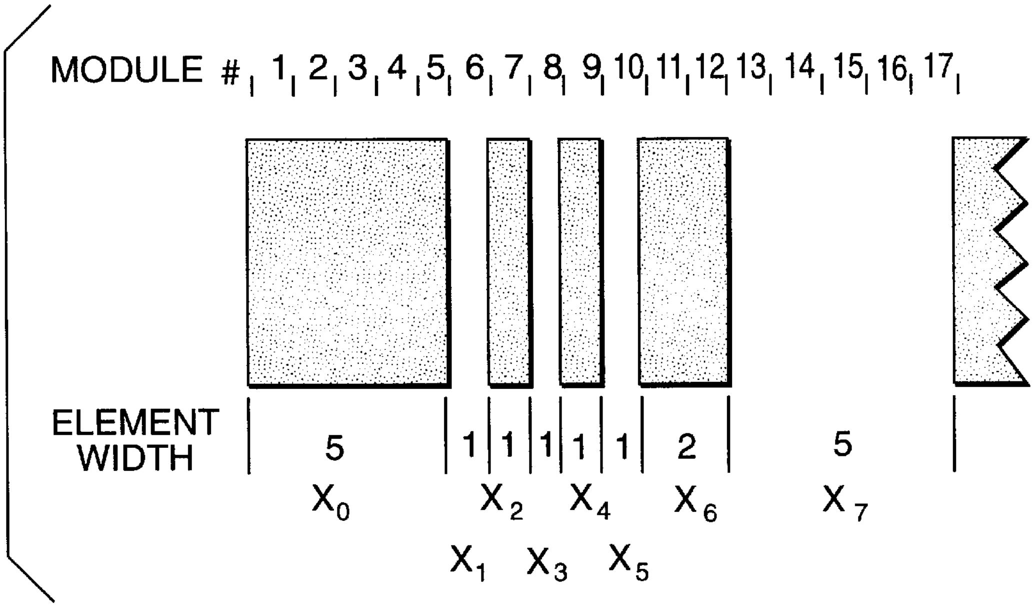
FIG. 14 is a diagram illustrating one example of a codeword in PDF417.

Each PDF417 codeword consists of seventeen modules or units. There are four bars and four spaces in each codeword. Individual bars or spaces can vary in width from one to six modules, but the combined total per codeword is always seventeen modules. Thus, each codeword can be defined by an eight-digit sequence, which represents the four sets of alternating bar and space widths within the codeword. This is called the "X-sequence" of the codeword and may be represented by the sequence $X_0$, $X_1$, . . . $X_7$. For example, for an X-sequence of "51111125", the first element is five modules wide, followed by five elements one module wide, one element two modules wide, and the last element five modules wide. This example is illustrated in FIG. 14.

The set of possible codewords is further partitioned into three mutually exclusive subsets called "clusters." In the PDF417 symbol, each row uses only one of the three clusters to encode data, and each cluster repeats sequentially every third row. Because any two adjacent rows use different clusters, the decoder is able to discriminate between codewords from different rows within the same scan line.

The cluster number of a codeword may be determined from its X-sequence using the following formula:

$$\text{cluster number}=(X_0-X_2+X_4-X_6) \bmod \mathbf{9}$$

where "mod 9" is the remainder after division by nine. Referring to the codeword in FIG. 2, the cluster number is calculated as follows:

$$\text{cluster number}=(5-1+1-2) \bmod \mathbf{9}=3$$

To minimize error probabilities, PDF417 uses only three clusters, even though nine are mathematically possible. Thus, each row uses only one of the three clusters 0, 3, or 6, to encode data, with the same cluster repeating sequentially every third row. Row 0 codewords, for example, use cluster 0, row 1 uses cluster 3, and row 2 uses cluster 6, etc. In general, the cluster number may be determined from the row number as follows:

$$\text{cluster number}=((\text{row number}) \bmod \mathbf{3}) * 3$$

There are 929 codeword values defined in PDF417. These values are 0 through 928. Each cluster presents the 929 available values with distinct bar-space patterns so that one cluster cannot be confused with another.

Figures 15, 16:
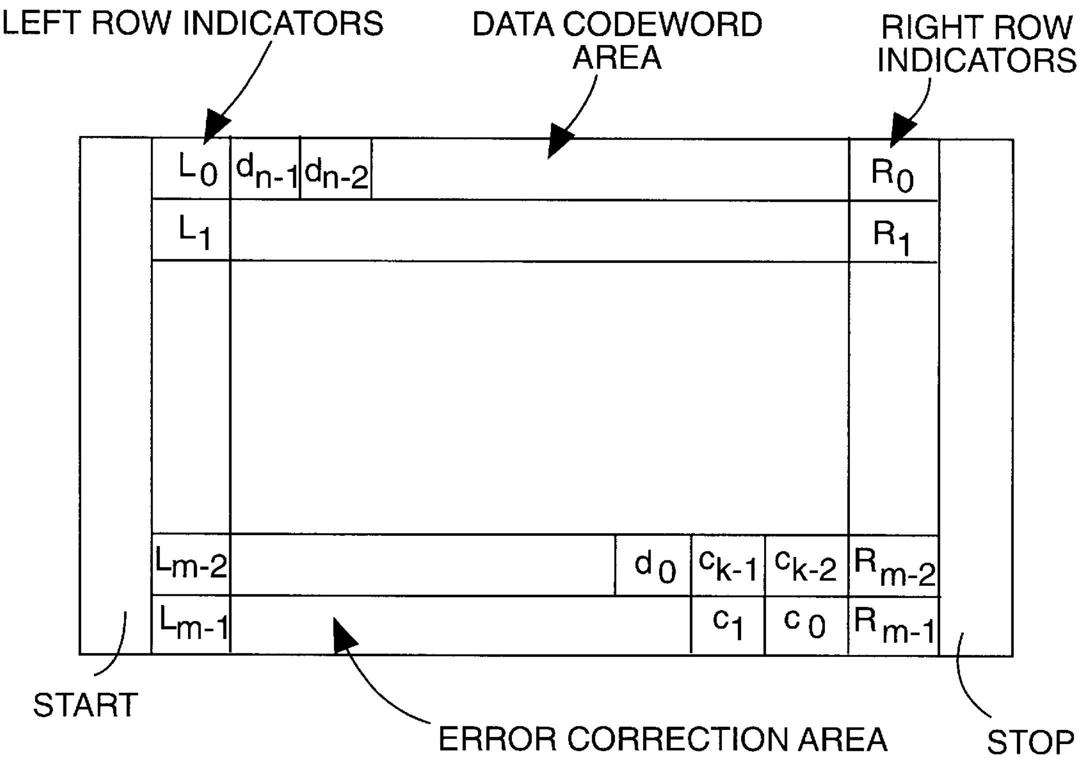
FIG. 15 is a diagram illustrating the overall structure of a PDF417 symbol.
FIG. 16 is a table listing the number of error correction codewords for a given security level in PDF417.

FIG. 15 is a block diagram showing the overall structure of a PDF417 symbol. Each row of the symbol consists of a start pattern, a left row indicator codeword $L_i$, data codewords $d_i$ or error detection/correction codewords $C_i$, a right row indicator codeword $R_i$, and a stop pattern. The minimum number of codewords in a row is three, including the left row indicator codeword, at least one data codeword, and the right row indicator codeword. The right and left row indicator codewords, which are discussed further below, help synchronize the structure of the symbol.

The start and stop patterns identify where each row of the symbol begins and ends. PDF417 uses unique start and stop patterns. The start pattern, or left side of each row, has the unique pattern, or X-sequence, of "81111113". The stop pattern, or right side of each row, has the unique X-sequence of "711311121".

Every symbol contains one codeword (the first data codeword in row 0) indicating the total number of codewords within the symbol, and at least two error-detection codewords $C_0$ and $C_1$. These two error-detection codewords together form a checksum which is two codewords long.

A PDF417 symbol can also encode data with error correction capability. The level of error correction capability, called the "security level," is selected by the user and ranges from 0 to 8.

This means, for example, that at level 6, a total of 126 codewords can be either missing or destroyed and the entire symbol can be read and decoded. FIG. 16 is a table showing the relationship between the security level of the PDF417 symbol and the number of error correction codewords $C_i$.

In addition to correcting for missing or destroyed data (known as "erasures"), PDF417 can also recover from misdecodes of codewords. Since it requires two codewords to recover from a misdecode, one to detect the error and one to correct it, a given security level can support half the number of misdecodes that it can of undecoded codewords.

This error correction feature is particularly useful when information in PDF417 format overlays partially erased coded words. This partial erasure creates the possibility that the unerased code portions will distort portions of the encoded information. If that happens, errors can be corrected with the PDF417 two-dimensional bar code.

The row indicator codewords in a PDF417 symbol contain several key components: row number, number of rows, number of data columns, and security level. Not every row indicator contains every component, however. The information is spread over several rows, and the pattern repeats itself every three rows. The pattern for encoding the information in the row indicator codewords can be illustrated as follows:

Row 0: $L_0$ (row #, # of rows) $R_0$ (row #, # of columns)

Row 1: $L_1$ (row #, security level) $R_1$ (row #, # of rows)

Row 2: $L_2$ (row #, # of columns) $R_2$ (row #, security level)

Row 3: $L_3$ (row #, # of rows) $R_3$ (row #, # of columns) etc.

In other words, the left row indicator codeword $L_0$ for the first row 0 contains the row number (0) and the total number of rows in the symbol. The right row indicator codeword $R_0$ for row 0 contains the row number (0) and the number of data columns in the symbol, and so on.

Encoding data into a PDF417 symbol is typically a two-step process. First, data is converted into codeword values of 0 to 928, which represent the data. This is known as "high-level encoding." The values are then physically represented by particular bar-space patterns, which is known as "low-level encoding."

Figure 17:
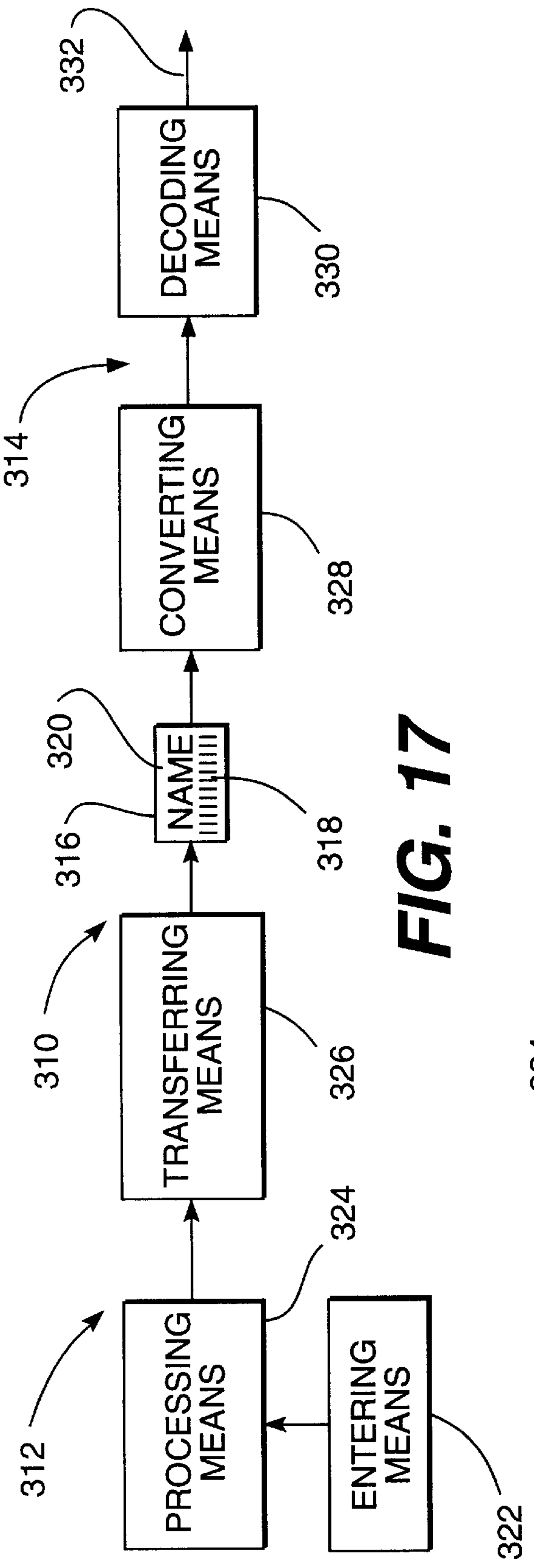
FIG. 17 is a block diagram of a system for printing and reading codes.
Figure 18:
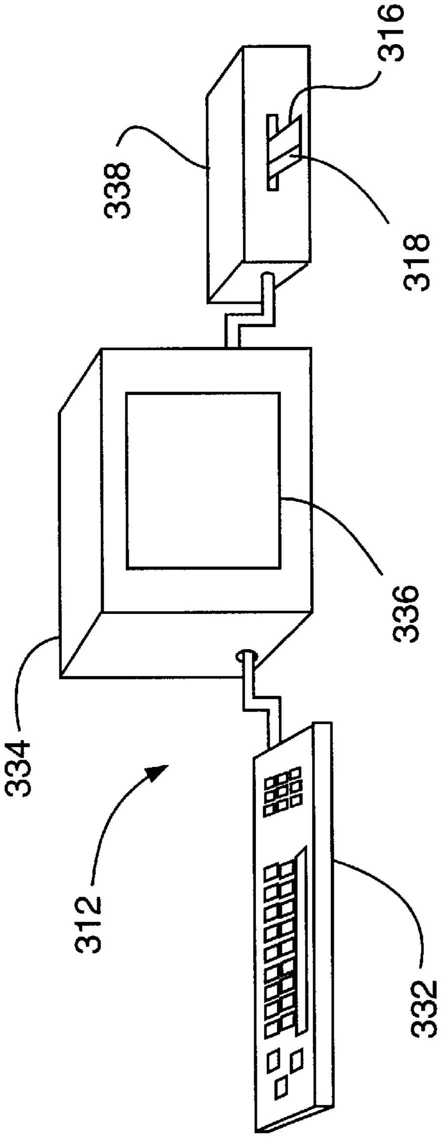
FIG. 18 is a perspective view of an encoding means of the system in FIG. 17.

Referring now to FIGS. 17–19 in the drawings, FIG. 17 is a block diagram of a system 310 for representing and recognizing data on a record in machine readable graphic image form. System 310 includes an encoding means, generally indicated by the reference numeral 312, and a recognition means, generally indicated by the reference numeral 314. The two-dimensional pattern is recognized by recognition means 314 to produce output signals representative of the data encoded into the respective pattern.

Data to be encoded into the two-dimensional pattern on record 318 is entered into the encoding means 312 by entering means 322. The data entered by entering means 322 may include both data to appear on record 316 in human readable form. Processing means 324 encodes the set of data into a two-dimensional pattern and generates transfer drive signals for controlling the transfer of indicia onto the record 316. Transferring means 326 transfers an image of the two-dimensional pattern 318 onto record 316 in response to the transfer drive signals. Preferably, transferring means 326 includes a printer which transfers either light-colored ink or ultraviolet-light sensitive ink as explained above.

If human readable data is also to be transferred onto record 316, the processing means 324 generates a second set of transfer drive signals for controlling the transfer of the human readable data onto record 316. A portion or all of the data to be encoded and the human readable data may be transferred from a storage memory in processing means 324 or other computer files rather than being entered by means 322.

Recognition means 314 includes converting means 328 that converts the image on record 316 into electrical signals representative of the graphic indicia. Decoding means 330 decodes the electrical signals into decoder output signals, indicated at 332, that are representative of the data encoded into the pattern 318.

FIG. 18 is a perspective view of one embodiment of encoding means 312. The embodiment of FIG. 18 is for illustrative purposes, and not meant to limit the scope of the invention. In this embodiment, the entering means 322 of FIG. 17 is shown in form of a keyboard 332 for entering alphanumeric and graphic data into the encoding means 312. Entering means 322 may take forms other than a keyboard, such as an optical scanning means for scanning data directly from documents for entry into the encoding means 312.

Referring again to FIG. 18, the processing means 324 of FIG. 17 is shown in the form of a processor and display unit 334. The data entered by keyboard 332 is transmitted to the processor and display unit 334 for storage and processing. In addition to entering data, the keyboard 332 is also used for entering control commands to effect operation of the processor unit 334.

The data entered by keyboard 332 is preferably displayed on display screen 336, and upon entry of a proper control command, is also stored in memory. The data to be encoded into the pattern 318 is stored in a first memory in processor 334, and the data, if any, to be transferred in human readable form is stored in a second memory. Alternatively, both data may be stored in a separate portion of a single memory. Upon the appropriate control command from keyboard 332, the processor unit 334 encodes the data in the first memory into a two-dimensional pattern 318 and generates first transfer drive signals representative of the data stored in the first memory. The processor unit 334 also generates second transfer drive signals representative of the data stored in the second memory.

The processor unit 334 is shown in FIG. 18 as being coupled to a printer 338. Printer 338 is one form of the transferring means 326 of FIG. 17. Printer 338 transfers an image of the two-dimensional pattern 318 on record 316 in response to the first transfer drive signals and prints the second set of data in human readable form onto record 316 in response to the second transfer drive signals.

Turning now to FIG. 19, the recognition means 314 includes a card reader 340 which contains the converting means 328 and the decoding means 330 of FIG. 17. The use of appropriate converting means that corresponds to the particular data encoding technology employed is contemplated by the present invention.

The converting means 328 may be a bar code reader such as those disclosed in U.S. patent application Ser. Nos. 317,433 and 317,533, and incorporated herein by reference, which can read the ink used by printer 338. The readers disclosed in the above patent applications are open system devices designed to read an optically encoded two-dimensional bar code and to convert the light reflected from the pattern into electrical signals representative of the graphic indicia.

The decoding means 330 decodes the electrical signals into output signals representative of the data encoded onto record 316. The decoder output signals are outputted from the recognition unit 340 to various output means 342. FIG. 19 depicts two examples of output devices, one being a display unit 344 and the other a printer 346. Display unit 344 may be any suitable display such as liquid crystal display or a CRT. The printer 346 may be any print device such as a dot matrix printer, laser printer, etc.

The system maximizes the use of available space for encrypting data. The density of the encoded data is such that for a two-dimensional bar code symbol, a minimum of about 1600 characters can be encoded into a space of approximately 5"×½". In addition to being compact, the system provides for high security in the transmission of information.

Although the encoding means 312 and the recognition means 314 are shown in FIGS. 17 through 19 as separate devices, they can be in the same device. This is particularly useful when a record is read and modified. In such cases it would be useful to have a single unit for both purposes.

A low-level decoder may be embodied in a computer program operating on a microcomputer separate from host computer 10. The low-level decoder would be preferably connected to the host computer by a standard interface, such as an RS-232 interface, for transmitting the codeword values after they are decoded. Alternatively, the low-level decoder could be embodied entirely in hardware, or a combination of a hardware and software, which is physically located in either the scanner itself or the host computer.

The matrix of codeword values from low-level decoder is decoded into usable data by a high-level decoder, which may be embodied as a separate computer program operating on the host computer. For example, PDF417 has three predefined modes and nine reserved modes. The predefined modes are Binary, EXC, and Numeric. In the Binary mode, each codeword can encode 1.2 bytes. In the EXC mode, the alphanumeric data can be encoded in double density (i.e., two characters per code word), and in Numeric mode, the numeric data can be packed in almost triple density. Therefore, the high-level decoder in host computer 112 will further decode the codeword values (0–928) from low-level decoder 114, depending on the mode, to obtain the actual data embodied in the symbol. The decoded data from the high-level decoder may then be used by a user application program also operating on host computer 10.

FIG. 20 shows a data entry device and reader for encrypting and decrypting data based on an encryption key.

Figure 21:
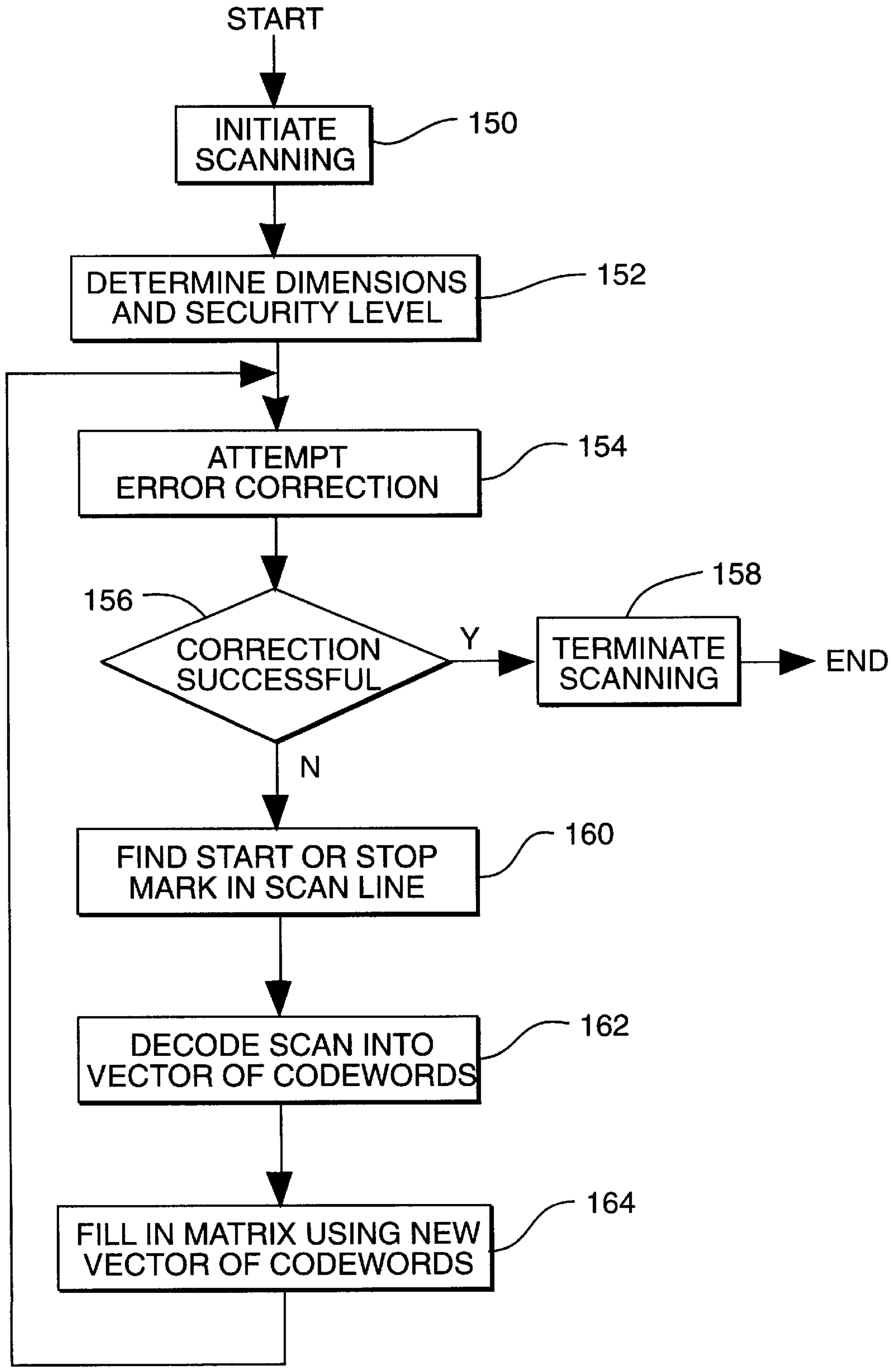
FIG. 21, is a flow diagram of the steps performed by a low-level decoder for decoding a two-dimensional bar code symbol.

FIG. 21 is a flow chart showing the sequence of operation of a low-level decoder for decoding a two-dimensional bar code symbol such as PDF417 into a matrix of codeword values. The various steps in the sequence are embodied in a software computer program which is stored and executed by processor 334.

In the first step 150 in FIG. 21, the low-level decoder initializes the scanner interface and initiates scanning of the symbol. The actual functions performed in this step will depend on the type of scanner and will involve various scanner-dependent routines to initialize the scanner interface and to start scanning.

In step 152, the low-level decoder attempts to determine the dimensions and the security level of the symbol being scanned. Specifically, this step determines the number of rows, the number of data columns, and the security level of the symbol from the left and right row indicator codewords. These dimensions are then used to initialize a two-dimensional codeword matrix and other related parameters for decoding the symbol. Each location in the matrix contains both a codeword value and an associated confidence weight, which are initially set to a null or empty value. If the dimensions and security level of the symbol cannot be determined, then the scan is aborted. This step will be discussed in further detail below in connection with FIG. 22.

Continuing in FIG. 21, step 154 is the first step in a control loop in which the rows of the two-dimensional bar code symbol are repeatedly scanned and the codeword values are filled into the codeword matrix. The steps of the control loop are each repeated until the number of codewords remaining in the matrix which have not been successfully decoded is small enough that the rest of the matrix can be determined using the built-in error correction capability of the symbol. Thus, in step 154, if the number of codewords which have not been successfully decoded is less than the error correction capability of the symbol based on the security level (see FIG. 4), an attempt is made to correct the matrix using the error-correction codewords. If the attempted error correction is successful, then in step 156, the control loop is exited and scanning is terminated in step 158. Otherwise, if the attempted error correction is not successful, then the following steps 160–164 are performed to try to decode additional codewords to fill in the matrix.

First, step 160 searches a scan line of data obtained from the buffer area of the memory for a start or a stop pattern. If either a start or a stop pattern is found, then in step 162, the low-level decoder attempts to decode as many codewords as possible from the scan line. Specifically, the scan line of data is parsed into individual codewords whose values and cluster numbers are placed in a codeword vector ready for incorporation into the codeword matrix. Both steps 160 and 162 are discussed in further detail below in connection with FIGS. 23 and 25, respectively.

The codeword vector produced in step 162 is analyzed and then used to update the codeword matrix in step 164. In particular, step 164 assigns a confidence weight to each codeword value depending on whether its nearest neighbors were also decoded. Row numbers are also assigned to each codeword value based on the left or right row indicator codewords and the corresponding cluster number for the codeword. If the scan line crosses a row boundary, the cluster numbers of the codewords can be used to determine the correct row number for each individual codeword. For example, if a decoded scan line has a left row indicator with row number 2, and the cluster numbers of the following codewords are 6, 0, 0, 3, the codewords are accordingly placed in the following locations: (row 2, column 1); (row 3, column 2); (row 3, column 3); and (row 4, column 4). In this way, a single scan line of data can contain codewords from more than one row, which can then be stitched into the appropriate location in the codeword matrix. This step is discussed in further detail in connection with FIGS. 28A and 28B below.

Figure 22:
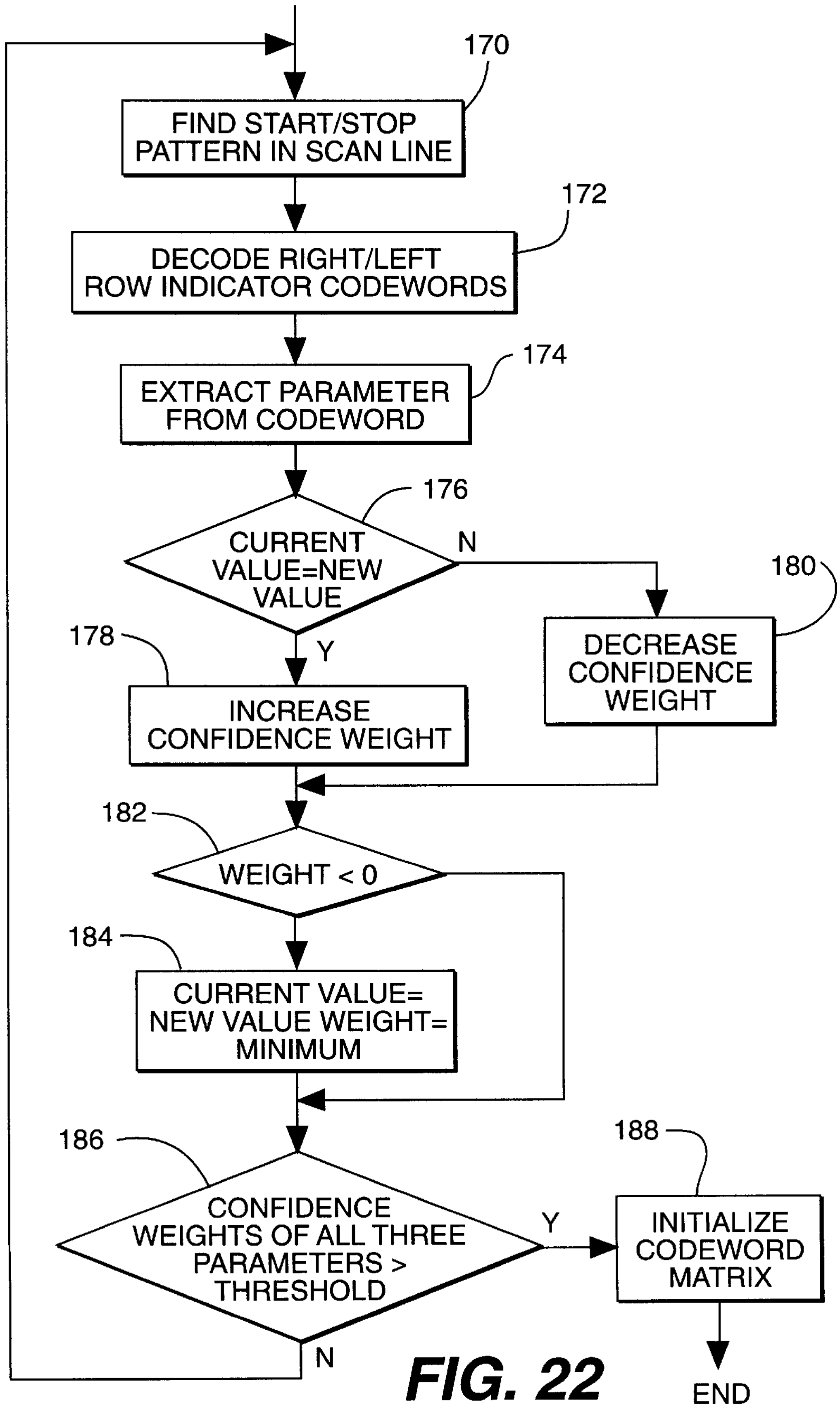
FIG. 22 is a flow diagram of the steps performed by the low-level decoder in FIG. 21 for determining the dimensions and security level of the symbol being scanned.

FIG. 22 is a flow chart showing in greater detail the sequence of steps for determining the dimensions and security level of a symbol as referred to in step 152 of FIG. 21 above.

In the first step 170 of FIG. 22, the low-level decoder searches a scan line of data obtained from the buffer area of the memory for a start or a stop pattern. This step is the same as step 160 in FIG. 21 and is discussed in further detail in connection with FIG. 23 below.

Step 172 then decodes the first codeword immediately adjacent to either the start or stop pattern found in the previous step. As shown in FIG. 15, this codeword will be either a left or right row indicator codeword containing the row number and either the number of rows, the number of data columns, or the security level of the symbol. If both a start and a stop pattern are found, then both the left and the right row indicators are decoded. The sequence of steps for decoding an individual codeword are discussed further below in connection with FIG. 27.

Continuing in FIG. 22, in step 174 the particular dimension or security level encoded in the row indicator is extracted from the codeword value and the cluster number determined in the previous step 172. For example, for a left row indicator codeword with a cluster number of 0, the number of rows is extracted from the codeword value.

A confidence weight assigned to each of the dimensions and the security level is initially set to 0. Steps 176–184 update both the current value and the confidence weight of the dimension or security level extracted in the previous step in the following way. First, the particular parameter, say the number of rows, is compared to the current value of the number of rows obtained from previous decodes. If the current value of the number of rows and the newly decoded value are the same, as determined in step 176, then the confidence weight assigned to the number of rows is increased in step 178. If the current value and the newly-decoded value are different, however, then the confidence weight is decreased in step 180. If the confidence weight assigned to the particular parameter is decreased below zero as determined in step 182, then the newly decoded value is substituted for the current value and a new minimum weight is assigned to the parameter in step 184.

Step 186 determines whether the confidence weight for all three parameters, i.e., number of rows, number of data columns, and security level, exceeds a predetermined threshold. If so, then the two-dimensional codeword matrix is initialized in step 188 based on the current values of the number of rows and the number of columns. The number of correctable errors may also be determined from the current value of the security level according to the table in FIG. 16. If all three confidence weights do not exceed the threshold in step 186, however, then program control returns to step 170 to begin searching for the start and stop patterns in a new scan line. Steps 170-184 are repeated until all three parameters have been successfully decoded with a high degree of confidence.

Figure 23:
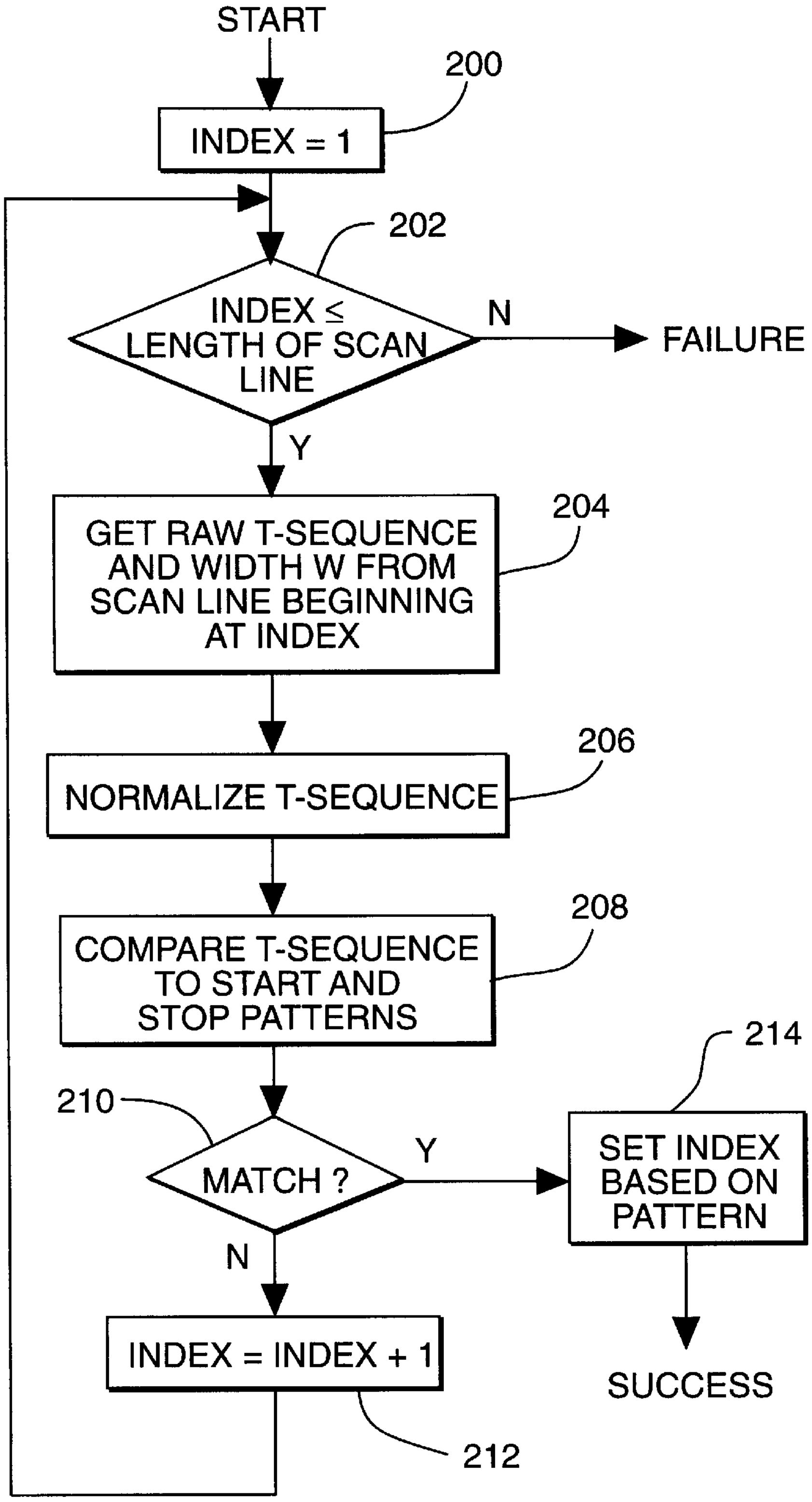
FIG. 23 is a flow diagram of the steps performed by the low-level decoder in FIG. 21 for searching a scan line of data for a start or a stop pattern.

FIG. 23 is a flow chart showing in greater detail the sequence of steps for searching a scan line of data for a start or stop pattern as referred to above in step 160 of FIG. 21 and step 170 of FIG. 22. Briefly, the search begins at the first location of an individual scan line of data obtained from the buffer area of the memory and is repeated at sequential locations until either a match is found or the length of the scan line is exceeded. When a match is found, an index is set to a location immediately following or preceding the pattern for decoding the adjacent code word.

As shown in FIG. 23, the first step 200 sets an index to the location of the data elements in the scan line to "1," indicating the first data element or integer value of the scan line. This index is used to identify the first element of each sequence of eight elements in the scan line for comparison to the start and stop patterns.

Step 202 is the first step of an iterative loop for searching the scan line from left to right for either a start or a stop pattern. In this step, if the current index is less than the length of the scan line, then the remaining steps are executed and the search continues. Once the index exceeds the length of the scan line, however, then the loop is exited and an indication is returned signifying that the search failed and a start or stop pattern was not found.

Figures 24, 26A:
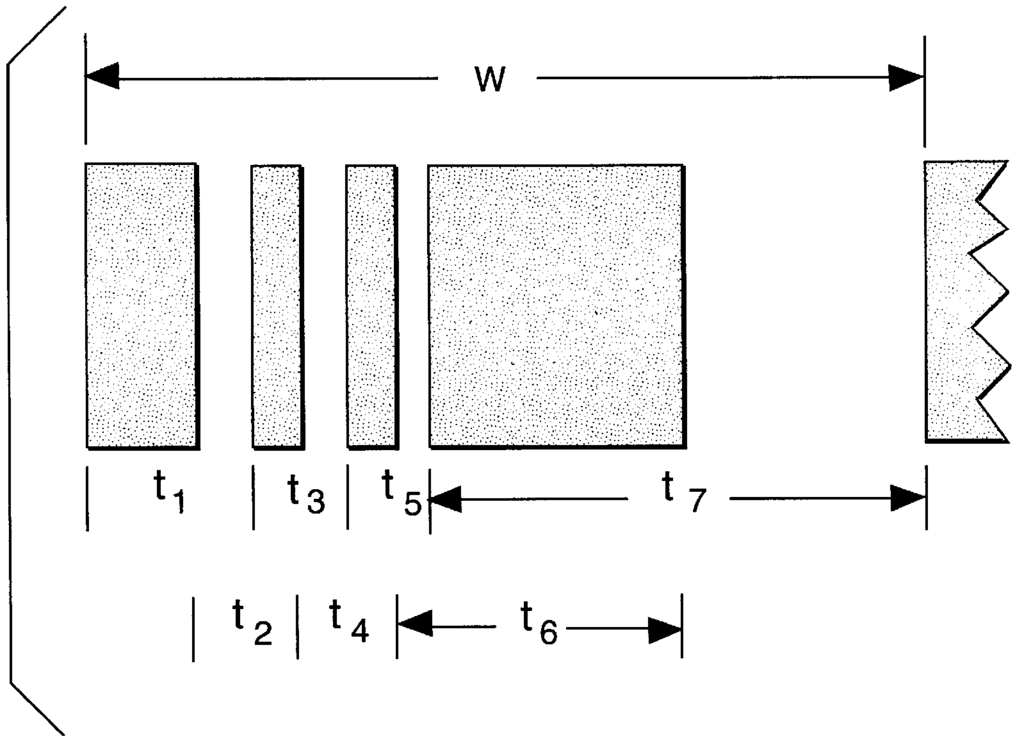

Rather than using the X-sequence of codeword, the low-level decoder decodes a symbol by using "edge to similar edge" measurements to compensate for ink spreading which occurs when printing the symbols. Thus, in step 204, a raw "t-sequence" is obtained from the scan line by adding pairs of consecutive integer values beginning at the location specified by the index. Specifically, the raw t-sequence, which corresponds to the seven width measurements $t_1$, $t_2$, . . . $t_7$ shown in FIG. 24, is calculated by adding pairs of the consecutive integer values $x_0$, $x_1$, . . . $x_7$, representing the widths of the bars and spaces, as follows:

$$t_1=x_0+x_1$$

$$t_2=x_1+x_2$$

$$t_3=x_2+x_3$$

etc.

A width W for the entire codeword is also calculated in step 204 by summing the eight integer values $x_0+x_1+. . . +x_7$.

For the codeword in FIG. 24, for example, the sequence of integer values from the scan line, representing the widths of the bars and spaces might be something like: 43, 19, 21, 19, 22, 18, 103, 96. The raw t-sequence $t_1$, $t_2$, . . . $t_7$ would then be 62, 40, 40, 41, 40, 121, 199, and the width W would be 341.

In step 206 in FIG. 23, the raw t-sequence obtained in step 204 is normalized and rounded to integer values. Specifically, a value for the codeword's "module" or "unit" is first established by dividing the width W of the codeword by the total number of units for each codeword. In a PDF417 symbol, each codeword is seventeen units, so that the width W is divided by seventeen to obtain the unit of the codeword. Thus, for the example in FIG. 24, the unit would be (341/17)=20.0. Each value of the raw t-sequence is then divided by the unit and rounded to an integer to normalize the t-sequence. The normalized t-sequence for the codeword in FIG. 24 is 3, 2, 2, 2, 2, 6, 10.

The normalized t-sequence is then compared to the t-sequences of the start and stop patterns of the code in step 208. If the scanner scans from both left to right and right to left, then the t-sequence must be compared to the start and stop patterns in both their normal and reverse orientations.

If there is a match in step 210, then the index is set in step 214 to a location in the scan line immediately following the pattern if it is a start pattern or immediately preceding it if it is a stop pattern. If the current t-sequence does not match either the start or the stop pattern, however, then in step 212, the index is incremented by one and steps 202 through 210 are repeated until either a match is found or the length of the scan line is exceeded.

Figure 25:
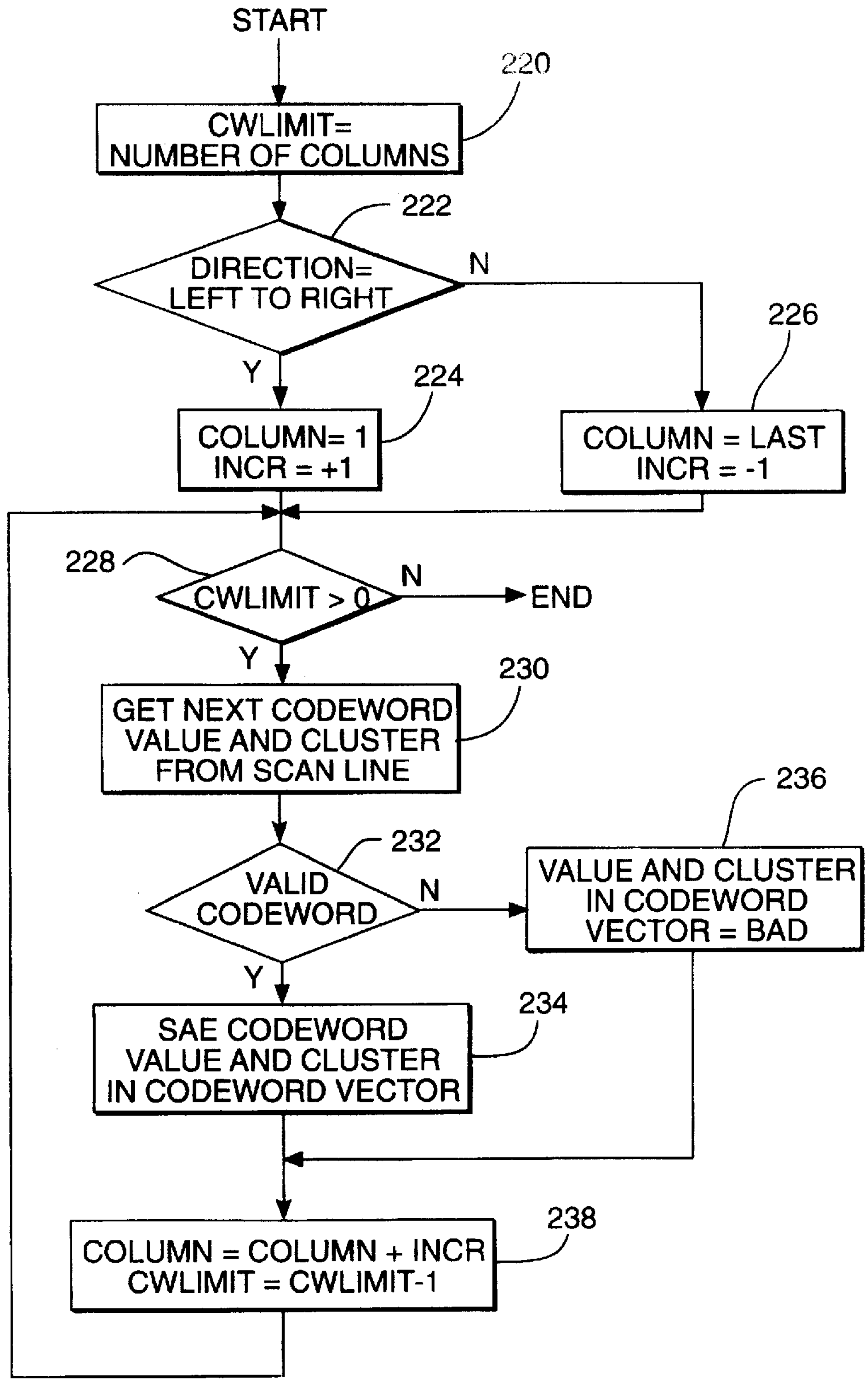
FIG. 25 is a flow diagram of the steps performed by the low-level decoder for decoding a scan line of data into a vector of codeword values and their cluster numbers.

FIG. 25 is a flow chart showing in greater detail the sequence of steps for decoding a scan line of data into a vector of codewords and their clusters as referred to in step 162 of FIG. 21 above. In decoding the individual codeword values and cluster numbers from the scan line, the low-level decoder begins decoding at the start or stop pattern and decodes as many codewords possible. For those codewords that are not successfully decoded, the codeword values in the codeword vector are set to "BAD."

At the completion of the sequence of steps shown in FIG. 25, the codeword vector will contain certain codeword values and cluster numbers in locations corresponding to the appropriate columns of the codewords that were successfully decoded. FIG. 26A shows an example of a codeword vector in which the codewords in eight of the ten columns were successfully decoded. The codeword values in columns 1 and 10 correspond to the left row indicator codeword in row 2 ($L_2$) and the right row indicator codeword in row 1 ($R_1$), respectively. The codewords in columns 5 and 7 were not successfully decoded as indicated by the notation "BAD" in those locations of the codeword vector.

Returning to the first step 220 of FIG. 25, an upper limit on the number of codewords that may be decoded ("cwlimit") is set equal to the number of columns in the codeword matrix. If this number of codewords is successfully decoded, then the decoding process for the current scan line is obviously complete.

Step 222 determines the direction of the scan if the scanner scans from both left to right and right to left. If the particular scan was from left to right as determined in step 222, then the column number of the first codeword is set to "1" in step 224 and the amount that it will incremented by ("incr") each time a subsequent codeword is decoded is set to "+1." If the scan was from right to left, however, then in step 226, the column number of the first codeword in the scan line will be the last column of the codeword matrix, and the incremental value is set to "−1".

Step 228 is the first step of a control loop in which individual codeword values and their cluster numbers are decoded from the scan line of data. In step 228, the codeword limit is tested to see if it is still greater than zero. If not, then all of the codewords in the scan line have been decoded and the loop is exited.

Otherwise, step 230 obtains the next codeword value and its cluster number from the scan line. This step will be discussed in further detail below in connection with FIG. 27.

If the codeword decoded in the previous step is a valid codeword as determined in step 232, then in step 234 the codeword value and its cluster number are saved in the codeword vector at a location corresponding to the column of the codeword. The codeword values thus placed in the codeword vector are ready for incorporation into the codeword matrix.

If the codeword decoded in step 230 is not a valid codeword, however, then the codeword value in the codeword vector corresponding to the current column is set to "BAD" in step 236 to indicate that this codeword was not successfully decoded. A "BAD" codeword is most likely to occur when the scan line crosses the boundary between two rows in the middle of the codeword.

Finally, in step 238, the current column number is either incremented or decremented depending on the direction of the scan, and the codeword limit is decremented by one. Steps 228–236 are then repeated until there has been an attempt to decode all of the codewords in the scan line.

Figure 27:
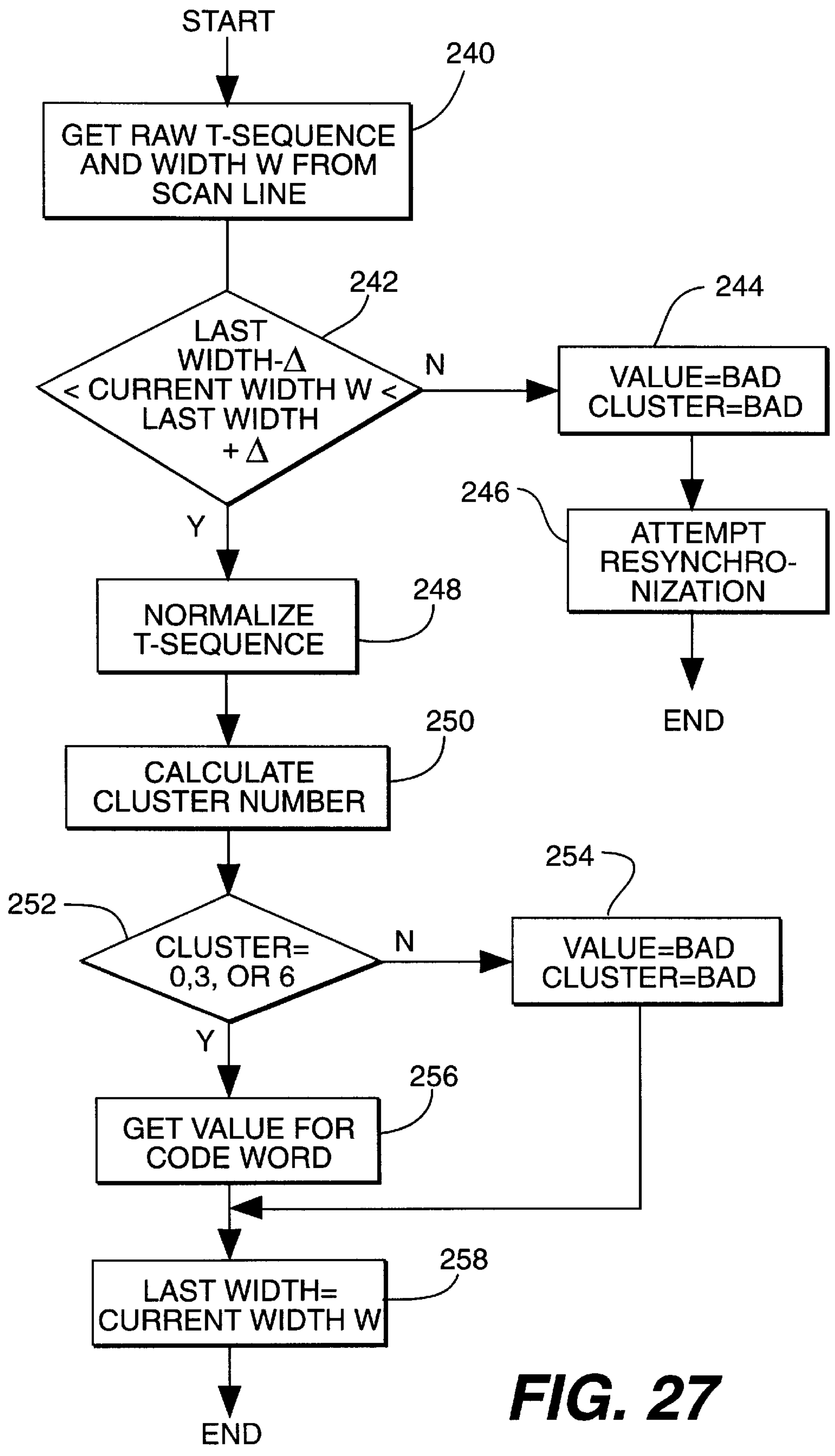
FIG. 27 is a flow diagram of the steps performed by the low-level decoder of FIG. 21 for decoding an individual codeword value and its cluster number from the scan line data.

FIG. 27 is a flow chart diagram showing the sequence of steps corresponding to step 230 in FIG. 25 and step 172 in FIG. 22 in which an attempt is made to decode an individual codeword value and cluster number from the scan line. In the first step 240, a raw t-sequence and the width W are obtained from the scan line. This same step was discussed previously in connection with step 204 in FIG. 23.

In step 242, the width W of the eight elements presumed to be the next codeword are compared to the width of the previously decoded codeword. If the current width W is not within a range of plus or minus a predetermined difference (delta), then there is probably a split (undercount by a multiple of two elements) or a merge (overcount by a multiple of two elements) error in the current codeword. This codeword is not decoded further, but rather in step 244 its value and cluster number are both set to BAD to indicate that it could not be decoded.

Then in step 246, an attempt is made to resynchronize to the boundary of the next codeword by finding a t-sequence with a corresponding width W that falls within a given tolerance of the expected width of a codeword, based on the width of the previous codeword. If the current width W is significantly greater than the expected width, indicating a possible merge error, then the last two integer values are dropped from the t-sequence until it falls within the proper limits. Likewise, if the current width W is significantly less than the expected width, indicating a possible split error, the next two integer values in the scan line are added to the t-sequence until it falls within the proper limits.

If the current width W is within a certain tolerance of the expected width, as determined in step 242, then an attempt is made to decode the codeword. In step 248, the raw t-sequence is normalized as described above in connection with step 206 in FIG. 23. Then in step 250, the cluster number is determined from the normalized t-sequence. The cluster number may be determined from the t-sequence (as opposed to the X-sequence described above) as follows:

$$\text{cluster number}=(T_1-T_2+T_5-T_6) \bmod 9$$

For codewords in PDF417, valid cluster numbers are 0, 3, and 6. If in step 252 it is determined that the cluster number is not 0, 3, or 6, then the codeword is not valid. Accordingly, in step 254 the cluster number and value are set to "BAD" to indicate that the codeword was not successfully decoded.

Otherwise, in step 256, the normalized t-sequence and its cluster number are used to find the corresponding codeword value in a look-up table. If no corresponding codeword value is found for the t-sequence, then the codeword value is set to "BAD" to indicate that it was not successfully decoded.

Finally, in step 258 the "last width" value is updated to the current width W of the codeword for use in decoding the next codeword value from the scan line.

Figure 28A:
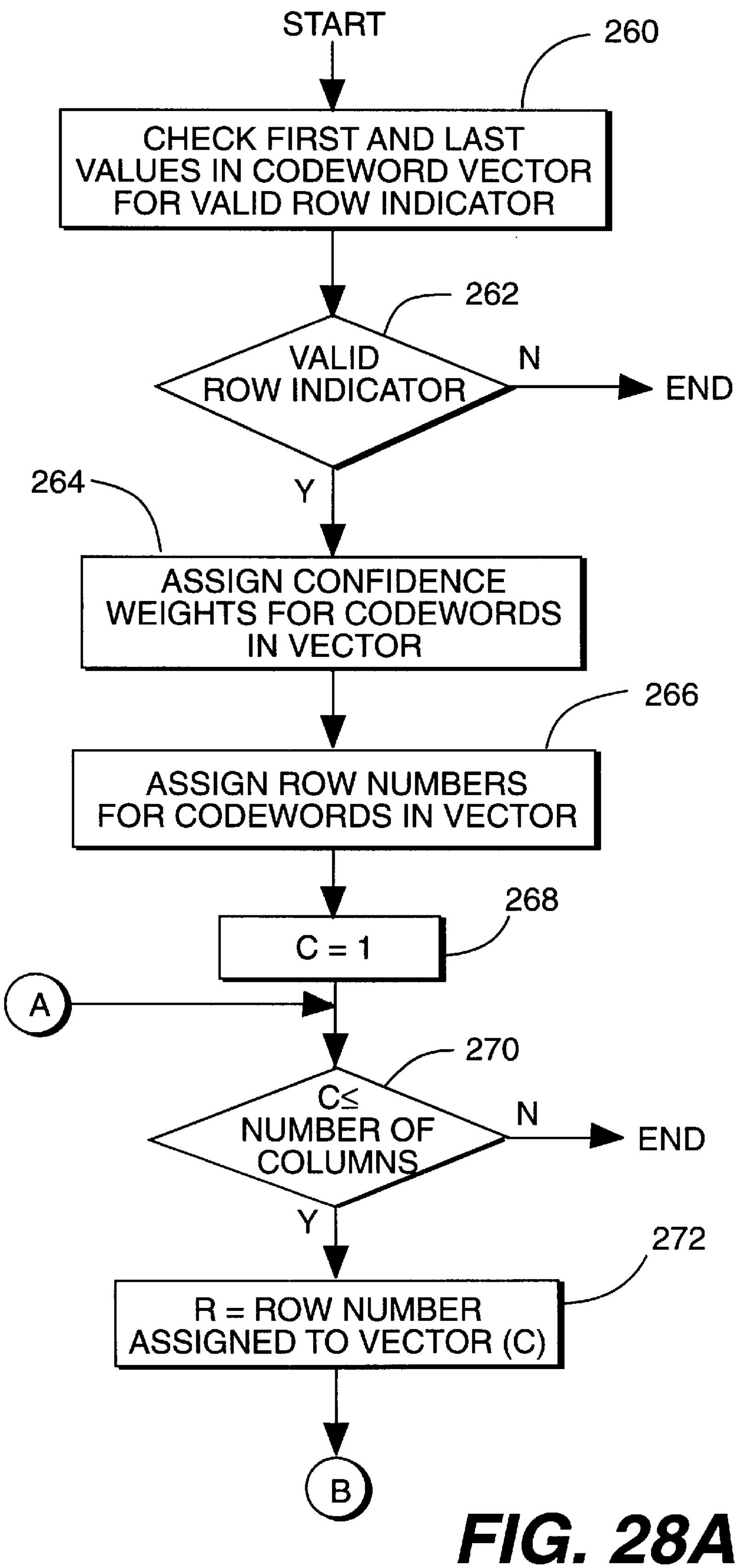
FIGS. 28A and 28B together are a flow diagram of the steps performed by the low-level decoder in order to update the codeword matrix using the codeword vector.
Figure 28B:
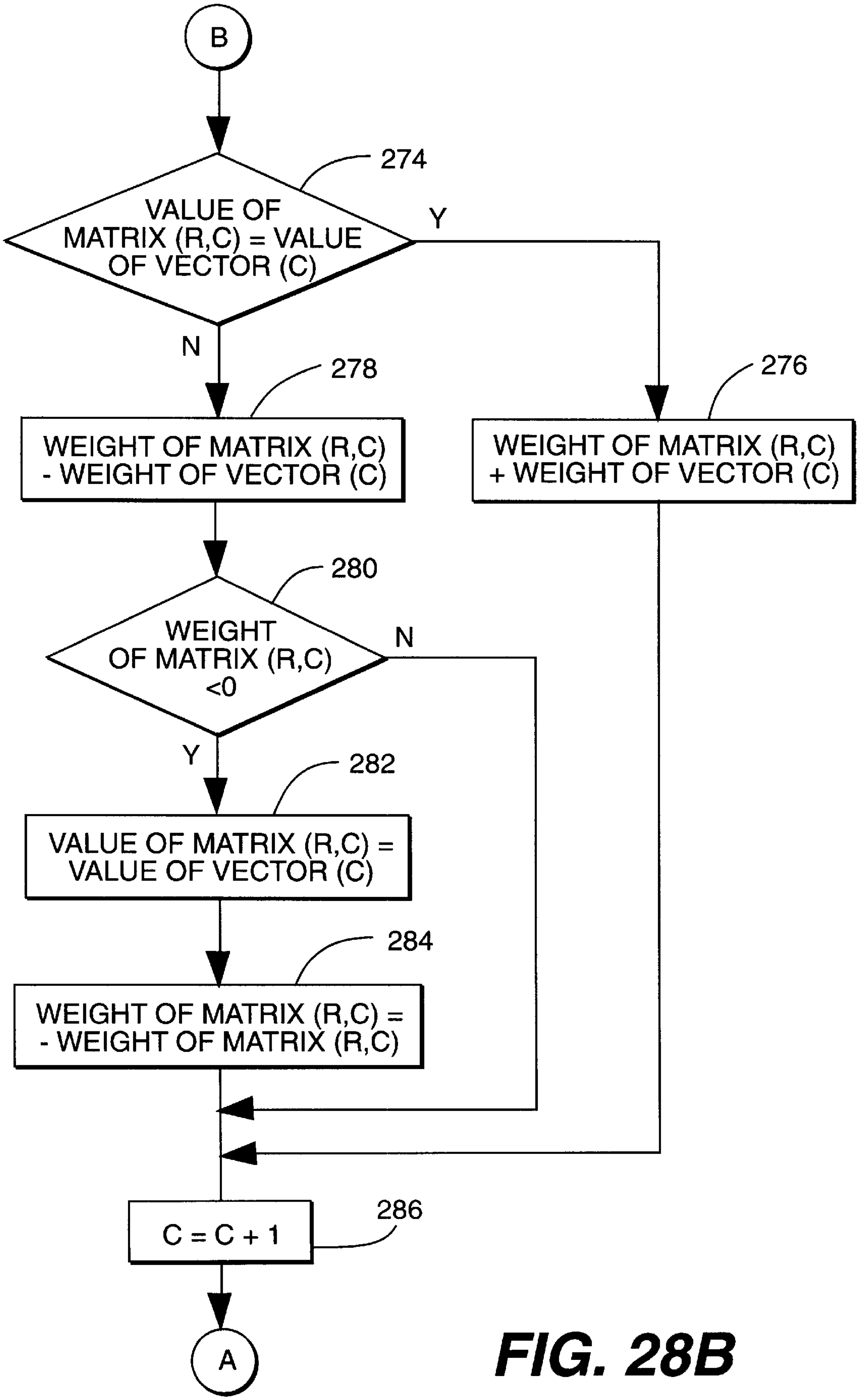

FIGS. 28A and 28B together comprise a flow chart of the sequence of steps executed by the low-level decoder in order to update the codeword matrix using the codeword vector. These figures explain in greater detail step 164 in FIG. 21 discussed above.

The first step 260 of FIG. 28A checks the first and last values in the codeword vector to see if either is a valid row indicator. If neither the first nor the last values in the codeword vector is a valid row indicator, then in step 262 the program exits the routine and no attempt is made to update the codeword matrix using the codeword vector.

If a valid row indicator is present, however, then in step 264 confidence weights are assigned to each codeword value in the codeword vector. Specifically, a confidence weight is assigned to each codeword depending on whether its nearest neighbors and their cluster were also decoded. For example, as shown in FIG. 26B, the codeword values in columns 1, 2, 3, 9, and 10 are assigned high confidence weights ("H") because their immediate neighbors were also successfully decoded and have the same cluster number. The codeword values for columns 4 and 8 are assigned medium confidence weights ("M") because one of their neighbors was successfully decoded and has the same cluster number but the other neighboring codeword value is "BAD." The codeword value in column 3 is assigned a very low confidence weight ("L") because neither of its neighbors was successfully decoded. Thus, the confidence weight for a codeword value at column i in the codeword vector is essentially a function of the cluster numbers of the codewords at columns i−1, i, and i+1. This function may be implemented by a look-up table whose index is calculated from the cluster numbers of the three codewords.

In step 266, a row number is assigned to each codeword value in the codeword vector based on the row indicator codewords and the cluster numbers. As shown in the example in FIG. 26C, the left row indicator codeword $L_2$ indicates that the row number is 2 and the cluster number is 6. The cluster numbers for the codeword values in columns 2–4 are also 6. Therefore, row number 2 is assigned to the codeword values in the first four columns of the codeword vector.

Also in the example in FIG. 26C, columns six and 8–10 all have a cluster number of 3 and the right row indicator codeword $R_1$ indicates that the row number is 1. Therefore, it can be assumed that the scan line crossed the row boundary between row 2 and row 1 and the codeword values in columns 6 and 8–10 should be assigned to row 1.

Once the confidence weights and row numbers have been assigned to each of the codeword values in the codeword vector, the codeword matrix is updated one codeword at a time. In step 268, the column number C of both the codeword vector and the codeword matrix is set is initially set to "1." Step 270 is the first step of an iterative loop which steps through the codewords in the codeword vector and uses them to update the corresponding codewords and their associated confidence weights in the codeword matrix. When the column number C exceeds the number of columns in step 270, then all of the codewords in the codeword vector have been processed and the routine ends.

For each codeword in the codeword vector, step 272 sets the row number R of the codeword matrix to the row number assigned in step 266 to the codeword in the codeword vector at the location C. Thus, for each codeword value in the codeword vector, there is a corresponding value in the codeword matrix at location [R,C].

Continuing in FIG. 28B, step 274 determines whether the current codeword value in location [R,C] in the codeword matrix is the same as the corresponding codeword value in the codeword vector at column C. If the values are the same, then in step 276, the confidence weight assigned to the codeword value in matrix location [R,C] is increased by the confidence weight of the corresponding codeword value in the codeword vector. If not, the confidence weight of the codeword value in the matrix is decreased by the confidence weight of the codeword value in the vector in step 278.

If the confidence weight was decreased in step 278, then in step 280 that confidence weight is tested to see if it was decreased below zero. If the confidence weight is less than zero, then in step 282 the new codeword value in the codeword vector is substituted for the current codeword value in the corresponding location in the codeword matrix. The confidence weight assigned to the codeword value in the matrix is also changed to a positive value in step 284.

Finally, in step 286 the column number C is incremented by 1 for processing the next codeword value in the codeword vector and program control is returned to step 270 for repeating steps 272 through 286 for all of the columns in the vector.

Returning briefly to step 154 in FIG. 21, each time after the codeword matrix has been filled in with the new vector of codeword values and the confidence weights have been updated, an attempt is made to fill in the rest of the matrix using the built-in error correction capability of the symbol. The number and location of codewords which have not yet been successfully decoded may be determined by comparing the confidence weights assigned to each of the codeword values in the matrix with a predetermined threshold. Those values having confidence weights below the threshold are considered to not yet be decoded. If the number of codewords not yet decoded is less than the error correction capability of the symbol as determined by the security level, then an attempt is made to correct the matrix.

It will be apparent to those skilled in the art that various modifications and variations can be made in the decoding method and apparatus without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An encoding/decoding carrier passenger boarding control system for use in a system for secure transmission of data, the system comprising:

encoding means including means for generating passenger ID data and luggage ID data, the passenger ID data including a number derived from at least one of passenger name and passenger social security number and the luggage ID data including the passenger ID data and a luggage description, means for encrypting at least some of said passenger and luggage ID data using an encryption algorithm based upon an encryption key, means for representing said encrypted data in the form of a bar code structure, said bar code structure including codewords of bar-coded information and security level information indicating a level of error correction capability, each of said codewords representing at least one information-bearing character, and means for transferring an image of the bar code structure onto a passenger boarding pass and passenger luggage; and decoding means including means for scanning the bar code structure on the passenger boarding pass and the passenger luggage and converting the codewords into output signals representative of said information-bearing characters, means for determining the level of error correction capability of the bar-coded information from the security level information, means for determining the number of codewords that were unsuccessfully converted, means for correcting the unsuccessfully converted codewords if the number of unsuccessfully converted codewords is less than the level of error correction capability, and means for decrypting at least some of said information-bearing characters using a decryption algorithm based upon said encryption key.

2. The apparatus of claim 1 wherein said entering means includes a keyboard for entering said data.

3. The apparatus of claim 1 wherein said entering means includes means for scanning said data from a sheet.

4. The apparatus of claim 1 wherein said transferring means is a printer.

5. The apparatus of claim 1 wherein said decoding means further includes an output device for displaying the decrypted data in human readable form.

6. The apparatus of claim 5 wherein said output device is a CRT display.

7. The apparatus of claim 5 wherein said output device is a liquid crystal display.

8. The apparatus of claim 5 wherein said output device is a printer.

9. An encoding apparatus for use in a traveler data management system for secure transmission of passenger and luggage ID data, the apparatus comprising:

means for generating the passenger and luggage ID data, the passenger ID data comprising a number derived from at least one of passenger name and passenger social security number, and the luggage ID data including the passenger ID data and a luggage description;

means for encrypting at least some of said passenger and luggage ID data using an encryption algorithm based upon an encryption key;

means for representing said encrypted data in the form of a bar code structure, said bar code structure including a plurality of codewords of bar-coded information and security level information indicating a level of error correction capability, each of said codewords representing at least one information-bearing character;

means for transferring an image of the bar code structure onto a passenger boarding pass and passenger luggage; and means for reading the bar code structure to determine whether all passengers and their respective luggage have boarded or departed a transportation carrier.

10. The apparatus of claim 9 wherein said entering means includes a keyboard for entering said data.

11. The apparatus of claim 9 wherein said entering means includes means for scanning said data from a sheet.

12. The apparatus of claim 9 wherein said transferring means is a printer.

13. A method of encoding and decoding carrier passenger and luggage ID data for secure transmission, comprising the steps of:

generating said passenger and luggage ID data into an encoding station the passenger ID data including a number derived from at least one of passenger name and passenger social security number and the luggage ID data including the passenger ID data and a luggage description;

encrypting at least some of said passenger and luggage ID data using an encryption algorithm based upon an encryption key;

representing said encrypted data in the form of a bar code structure, said bar code structure including codewords of bar-coded information and security level information indicating a level of error correction capability, each of said codewords representing at least one information-bearing character;

transferring an image of the bar code structure onto a passenger boarding pass and passenger luggage;

scanning the bar code structure in a separate decoding station and converting the codewords into output signals representative of said information-bearing characters;

determining the level of error correction capability of the bar-coded information from the security level information;

determining the number of codewords that were unsuccessfully converted;

correcting the unsuccessfully converted codewords if the number of unsuccessfully converted codewords is less than the level of error correction capability; and decrypting at least some of said information-bearing characters using a decryption algorithm based upon said encryption key.

14. The method of claim 13 wherein said entering step includes the substep of entering said data on a keyboard.

15. The method of claim 13 wherein said entering step includes the substep of scanning said data from a sheet.

16. The method of claim 13 wherein said transferring step includes the substep of printing the image onto the passenger boarding pass and the passenger luggage.

17. The method of claim 13 further comprising the step of displaying the decrypted data in human readable form.

18. The method of claim 17 wherein said displaying step includes the substep of displaying the decrypted data on a CRT display.

19. The method of claim 17 wherein said displaying step includes the substep of displaying the decrypted data on a liquid crystal display.

20. The method of claim 17 wherein said displaying step includes the substep of displaying the decrypted data on a printer.

* * * * *

UNITED STATES PATENT AND TRADEMARK OFFICE

CERTIFICATE OF CORRECTION

PATENT NO. : 5,866,888

DATED : February 2, 1999

INVENTOR(S) : Richard BRAVMAN et al.

It is certified that error appears in the above-identified patent and that said Letters Patent is hereby corrected as shown below:

Claim 13, col. 24, line 67, after "station" insert --,--; and
col. 25, line 2, after "number" insert --,--.

Signed and Sealed this

Eighth Day of June, 1999

Attest:

Q. TODD DICKINSON

Attesting Officer

*Acting Commissioner of Patents and Trademarks*